(12) United States Patent
Wentink et al.

(10) Patent No.: US 9,515,925 B2
(45) Date of Patent: Dec. 6, 2016

(54) APPARATUS AND METHODS FOR MEDIA ACCESS CONTROL HEADER COMPRESSION

(75) Inventors: Maarten Menzo Wentink, Breukelen (NL); Santosh Paul Abraham, San Diego, CA (US); Simone Merlin, San Diego, CA (US); Geert Awater, Utrecht (NL); Mohammad H. Taghavi Nasrabadi, San Diego, CA (US); Zhi Quan, San Diego, CA (US); Hemanth Sampath, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/474,564

(22) Filed: May 17, 2012

(65) Prior Publication Data

US 2013/0128808 A1    May 23, 2013

Related U.S. Application Data

(60) Provisional application No. 61/487,814, filed on May 19, 2011, provisional application No. 61/506,779, filed on Jul. 12, 2011, provisional application No. 61/514,365, filed on Aug. 23, 2011, provisional (Continued)

(51) Int. Cl.
*H04W 4/00* (2009.01)
*H04L 12/741* (2013.01)
*H04L 29/06* (2006.01)
*H04W 8/26* (2009.01)
*H04W 84/12* (2009.01)

(52) U.S. Cl.
CPC .......... *H04L 45/74* (2013.01); *H04L 29/0604* (2013.01); *H04W 8/26* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,604,149 | B1 | 8/2003 | Deo et al. |
| 6,680,955 | B1 | 1/2004 | Le |
| 6,975,647 | B2 | 12/2005 | Neale et al. |
| 7,170,893 | B2 | 1/2007 | Rajan et al. |
| 7,551,644 | B1 | 6/2009 | Mohaban et al. |
| 7,633,970 | B2 | 12/2009 | Van Kampen et al. |
| 7,899,056 | B2 | 3/2011 | Chen et al. |

(Continued)

FOREIGN PATENT DOCUMENTS

| | | |
|---|---|---|
| CA | 2316533 A1 | 2/2002 |
| CN | 1691663 A | 11/2005 |

(Continued)

OTHER PUBLICATIONS

International Search Report and Written Opinion—PCT/US2012/038699—ISA/EPO—Nov. 29, 2012.

(Continued)

*Primary Examiner* — Rhonda Murphy
(74) *Attorney, Agent, or Firm* — Sayed H. Beladi

(57) ABSTRACT

Systems, methods, and devices for communicating packets having a plurality of types are described herein. In some aspects, the packets include a compressed MAC header. In some aspects the packets include an acknowledgment (ACK) frame. The fields included in a particular packet type may be based on the type of information to be communicated to the receiving device.

32 Claims, 32 Drawing Sheets

Related U.S. Application Data application No. 61/566,535, filed on Dec. 2, 2011, provisional application No. 61/569,653, filed on Dec. 12, 2011, provisional application No. 61/579,179, filed on Dec. 22, 2011, provisional application No. 61/584,419, filed on Jan. 9, 2012, provisional application No. 61/588,706, filed on Jan. 20, 2012, provisional application No. 61/595,487, filed on Feb. 6, 2012, provisional application No. 61/602,754, filed on Feb. 24, 2012, provisional application No. 61/606,271, filed on Mar. 2, 2012, provisional application No. 61/637,042, filed on Apr. 23, 2012, provisional application No. 61/642,252, filed on May 3, 2012.

(56) References Cited

U.S. PATENT DOCUMENTS

| | | | |
|---|---|---|---|
| 7,974,312 B2 | 7/2011 | Ahmadi et al. | |
| 8,014,377 B2 | 9/2011 | Zhang et al. | |
| 2003/0112780 A1 | 6/2003 | Ouyang et al. | |
| 2003/0208615 A1* | 11/2003 | Rousseau | H04L 47/10 709/233 |
| 2004/0033801 A1 | 2/2004 | Yi et al. | |
| 2004/0120292 A1 | 6/2004 | Trainin | |
| 2004/0213274 A1* | 10/2004 | Fan et al. | 370/401 |
| 2004/0258092 A1 | 12/2004 | Sugaya | |
| 2005/0036469 A1 | 2/2005 | Wentink | |
| 2005/0041660 A1* | 2/2005 | Pennec et al. | 370/389 |
| 2005/0135284 A1 | 6/2005 | Nanda et al. | |
| 2005/0265298 A1* | 12/2005 | Adachi | H04W 72/1289 370/338 |
| 2006/0248429 A1 | 11/2006 | Grandhi et al. | |
| 2007/0002850 A1 | 1/2007 | Guichard et al. | |
| 2007/0047583 A1 | 3/2007 | Assa et al. | |
| 2007/0058679 A1 | 3/2007 | Pelletier et al. | |
| 2007/0077936 A1* | 4/2007 | Tomisawa | H04W 74/0816 455/450 |
| 2007/0110055 A1 | 5/2007 | Fischer et al. | |
| 2008/0019515 A1 | 1/2008 | Tseng et al. | |
| 2008/0025213 A1 | 1/2008 | Gotou et al. | |
| 2008/0025312 A1 | 1/2008 | Kuppuswamy et al. | |
| 2008/0104485 A1 | 5/2008 | Lyakh et al. | |
| 2008/0130538 A1 | 6/2008 | Raissinia et al. | |
| 2008/0219176 A1 | 9/2008 | Yamada | |
| 2008/0273700 A1 | 11/2008 | Wentink | |
| 2008/0310339 A1 | 12/2008 | Kano | |
| 2009/0003347 A1 | 1/2009 | Yang et al. | |
| 2009/0059958 A1 | 3/2009 | Nakata | |
| 2009/0103561 A1 | 4/2009 | Qi et al. | |
| 2009/0122755 A1 | 5/2009 | Seok et al. | |
| 2009/0141670 A1 | 6/2009 | Duncan Ho | |
| 2009/0141723 A1 | 6/2009 | Giesberts et al. | |
| 2009/0146833 A1 | 6/2009 | Lee et al. | |
| 2010/0046550 A1 | 2/2010 | Mammarappallil et al. | |
| 2010/0046553 A1 | 2/2010 | Daigle et al. | |
| 2010/0050054 A1 | 2/2010 | Abraham et al. | |
| 2010/0128741 A1 | 5/2010 | Agiwal et al. | |
| 2010/0135495 A1 | 6/2010 | Chion et al. | |
| 2010/0142560 A1 | 6/2010 | Sharivker et al. | |
| 2010/0172375 A1 | 7/2010 | Rochon et al. | |
| 2010/0208655 A1 | 8/2010 | Kim et al. | |
| 2011/0069688 A1* | 3/2011 | Zhang | H04L 1/0083 370/338 |
| 2011/0080873 A1 | 4/2011 | Zhang et al. | |
| 2011/0149822 A1 | 6/2011 | Sammour et al. | |
| 2011/0149848 A1 | 6/2011 | Ho et al. | |
| 2011/0164586 A1 | 7/2011 | Kim et al. | |
| 2011/0205972 A1 | 8/2011 | Yuk et al. | |
| 2012/0099567 A1* | 4/2012 | Hart | H04L 12/4633 370/338 |
| 2013/0128809 A1* | 5/2013 | Wentink | H04L 29/0604 370/328 |
| 2013/0215836 A1 | 8/2013 | Quan et al. | |
| 2013/0230038 A1 | 9/2013 | Walton et al. | |
| 2014/0010102 A1* | 1/2014 | Cho | H04W 8/186 370/252 |
| 2014/0307726 A1* | 10/2014 | Kang | H04W 76/023 370/338 |
| 2014/0365686 A1* | 12/2014 | Ruan | G06F 13/387 709/250 |

FOREIGN PATENT DOCUMENTS

| | | |
|---|---|---|
| CN | 1759631 A | 4/2006 |
| CN | 102144371 A | 8/2011 |
| EP | 1589704 A2 | 10/2005 |
| JP | 2002135231 A | 5/2002 |
| JP | 2004343567 A | 12/2004 |
| JP | 2005260939 A | 9/2005 |
| JP | 2007174536 A | 7/2007 |
| JP | 2008005508 A | 1/2008 |
| JP | 2009112038 A | 5/2009 |
| JP | 2010503328 A | 1/2010 |
| JP | 2011139515 A | 7/2011 |
| JP | 2012501103 A | 1/2012 |
| JP | 2012514369 A | 6/2012 |
| KR | 20010009760 A | 2/2001 |
| KR | 20110093656 A | 8/2011 |
| RU | 2144733 C1 | 1/2000 |
| WO | 9429971 A1 | 12/1994 |
| WO | 0167709 A2 | 9/2001 |
| WO | 2005039133 A1 | 4/2005 |
| WO | 2008024321 A2 | 2/2008 |
| WO | 2008030679 A2 | 3/2008 |
| WO | 2009004631 A1 | 1/2009 |
| WO | 2009034553 A2 | 3/2009 |
| WO | 2010022270 A2 | 2/2010 |
| WO | 2010027191 A2 | 3/2010 |
| WO | 2010076700 A1 | 7/2010 |
| WO | 2010100014 A1 | 9/2010 |
| WO | 2010144561 A1 | 12/2010 |
| WO | 2011022410 A1 | 2/2011 |
| WO | WO2012044866 | 4/2012 |
| WO | 2012159094 A2 | 11/2012 |
| WO | 2013116132 A1 | 8/2013 |

OTHER PUBLICATIONS

Beecher P., "Jan. 2008-minutes-tg4e; 15-08-0062-00-004e-Jan. 2008-minutes-tg 4e", IEEE Draft; 15-08-0062-00-004E-Jan. 2008-Minutes-TG-4E, IEEE-SA Mentor, Piscataway, NJ USA, Integration UK LTD, vol. 802.154e, Jan. 16, 2008 (Jan. 16, 2008), pp. 1-7, XP017668447, [retrieved on Jan. 16, 2008] paragraph [8:14] paragraph [13:44].

Casado L., et al., "ContikiSec: A Secure Network Layer for Wireless Sensor Networks under the Contiki Operating System", Oct. 14, 2009 (Oct. 14, 2009), Identity and Privacy in the Internet Age, Springer Berlin Heidelberg, Berlin, Heidelberg, pp. 133-147, XP019132224, ISBN: 978-3-642-04765-7 p. 135, paragraph 2.

"Data link layer (DLL) for unified high-speed wire-line based home networking transceivers; G.9961 (Jun. 2010)", ITU-T Standard, International Telecommunication Union, Geneva, CH, No. G.9961 (Jun. 2010), Jun. 11, 2010 (Jun. 11, 2010), pp. 1-220, XP017467820, [retrieved on Jul. 22, 2011] p. 11, paragraph 2 paragraph [8.1.3.4] figure A.1 p. 209, paragraph 1-4.

Lashkari A.H., et al., "Wired Equivalent Privacy (WEP)", Future Computer and Communication, 2009 International Conference on, IEEE, Piscataway, NJ, USA, Apr. 3, 2009 (Apr. 3, 2009), pp. 492-495, XP031499558, ISBN: 978-0-7695-3591-3 p. 495, col. 2, paragraph 2.

Nanda S., et al., "High Throughput Enhancements Presentation: Features and Performance; 11-04-0873-02-000n-high-throughput-enhancements-presentation-features-and-performance", IEEE Draft; 11-04-0873-02-000N-High-Throughput-Enhancements-Presentation-Features-And-Performance, IEEE-SA Mentor, Piscataway, NJ USA, vol. 802.11n, No. 2, Sep. 16, 2004 (Sep. 14, 2004), pp. 1-53, XP017690511, [retrieved on Sep. 16, 2004] p. 9.

Bormann C., et al., "Robust Header Compression (RoHC): Framework and four profiles: RTP, UDP, ESP and uncompressed," Internet Engineering Task Force, (RFC) 3095, Jul. 2001, pp. 1-168.

\* cited by examiner

300a

| Field Name | Size in Octets | Field Description |
|---|---|---|
| fc | 2 | frame control |
| dur | 2 | duration/id |
| a1 | 6 | receiver address |
| a2 | 6 | transmitter address |
| a3 | 6 | destination address |
| sc | 2 | sequence control |
| qc | 2 | quality of service control |
| htc | 4 | header type control |
| ccmp | 8 | counter-mode/cbc-mac protocol |
| llc/snap | 8 | logical link control/subnetwork access protocol |
| mic | 8 | message integrity check |
| fcs | 4 | frame control sequence |
| TOTAL SIZE: | 58 | |

– 305a
– 310a
– 315a
– 320a
– 325a
– 330a
– 335a
– 340a
– 345a
– 350a
– 360a
– 365a

305a

| Field Name | Size in Bits | Field Description |
|---|---|---|
| pv | 2 | protocol version |
| type | 2 | frame type |
| subtype | 4 | frame subtype |
| to-ds | 1 | to distribution system |
| from-ds | 1 | from distribution system |
| more frag | 1 | more fragments |
| retry | 1 | retry |
| pm | 1 | power management |
| md | 1 | more data |
| pf | 1 | protected frame |
| order | 1 | order |
| TOTAL SIZE: | 16 | |

|            | Data 415 420 |          |          |          | ACK      |
|------------|--------------|----------|----------|----------|----------|
| Direction  | To-DS/From-DS | A1 (Rx) | A2 (Tx) | A3 (SA/DA) | A1 (Rx) |
| DL         | 01           | AID      | BSSID    | (SA)     | pBSSID   |
| UL         | 10           | BSSID    | AID      | (DA)     | AID      |
| Direct     | 00           | RA       | AID      |          | AID      |

FIG. 5

|            | Data 415 420 |          |          |          | BA       |          |          |
|------------|--------------|----------|----------|----------|----------|----------|----------|
| Direction  | To-DS/From-DS | A1 (Rx) | A2 (Tx) | A3 (SA/DA) | To-DS/From-DS | A1 (Rx) | A2 (Tx) |
| DL         | 01           | AID      | BSSID    | (SA)     | 10       | BSSID    | AID      |
| UL         | 10           | BSSID    | AID      | (DA)     | 01       | AID      | BSSID    |
| Direct     | 00           | RA       | AID      |          | 00       | AID      | RA       |

FIG. 6

|           | 415 Data Packet 420 |              |         | Block ACK  |          |
|-----------|---------------------|--------------|---------|------------|----------|
| Direction | Data A1 (Rx)        | Data A2 (Tx) | Data A3 | BA A1 (Rx) | BA A2 (Tx) |
| DL        | AID                 | BSSID        | (SA)    | AID        | BSSID    |
| UL        | 0                   | STA_MAC      | (DA)    | 0          | STA_MAC  |
| Direct    | R-AID               | TA           |         | R-AID      | TA       |

FIG. 7

|           | Data  |       |       |         | BA    |       |       |
|-----------|-------|-------|-------|---------|-------|-------|-------|
| Direction | R-AID | T-AID | BSSID | (SA/DA) | R-AID | T-AID | BSSID |
| DL        | AID   | 0     | BSSID | (SA)    | 0     | AID   | BSSID |
| UL        | 0     | AID   | BSSID | (DA)    | AID   | 0     | BSSID |
| Direct    | AID1  | AID2  | BSSID |         | AID2  | AID1  | BSSID |

FIG. 8

| Data | | | | | ACK |
|---|---|---|---|---|---|
| Direction | R-AID | T-AID | BSSID | (SA/DA) | R-ID |
| DL | AID | 0 | BSSID | (SA) | 0 |
| UL | 0 | AID | BSSID | (DA) | AID |
| Direct | AID1 | AID2 | BSSID | | AID2 |

FIG. 9

| Data | | 415 | 420 | | ACK |
|---|---|---|---|---|---|
| Direction | to-DS/from-DS | A1 (AID) | A2 (BSSID) | A3 (SA/DA) | A1 (Rx) |
| DL | 01 | AID | BSSID | (SA) | pBSSID |
| UL | 10 | AID | BSSID | (DA) | AID |
| Direct | 00 | T-AID | RA | | AID |

FIG. 10

| Data | | 415 | 420 | | BA | | |
|---|---|---|---|---|---|---|---|
| Direction | to-DS/from-DS | A1 (AID) | A2 (BSSID/RA) | A3 (SA/DA) | to-DS/from-DS | A1 (Rx) | A2 (Tx) |
| DL | 01 | AID | BSSID | (SA) | 10 | AID | BSSID |
| UL | 10 | AID | BSSID | (DA) | 01 | AID | BSSID |
| Direct | 00 | AID | RA | | 00 | AID | RA |

FIG. 11

| Data | | 415 | 420 | | ACK |
|---|---|---|---|---|---|
| Direction | to-DS/from-DS | A1 (AID) | A2 (BSSID) | A3 (SA/DA) | A1 (Rx) |
| DL | 01 | BSSID | AID | (SA) | pBSSID |
| UL | 10 | BSSID | AID | (DA) | AID |
| Direct | 00 | RA | T-AID | | AID |

FIG. 12

FIG. 13

| Direction | Management frame | 415 | 420 | ACK |
| --- | --- | --- | --- | --- |
| | to-DS/ from-DS | A1 (Rx) | A2 (Tx) | A1 (Rx) |
| DL | 01 | AID | BSSID | pBSSID |
| UL | 10 | BSSID | AID | AID |

FIG. 14

| Direction | Data | 415 | 420 | ACK |
| --- | --- | --- | --- | --- |
| | A1 (Rx) | A2 (Tx) | A1 (Rx) | |
| DL | STA-AID | BSSID | BSSID | |
| UL | BSSID | STA-MAC | STA-MAC | |
| Direct | R-STA-MAC | T-STA-MAC | T-STA-MAC | |

| Data | | | |
|---|---|---|---|
| Direction | A1 (Rx) | A2 (Tx) | A3 (SA/DA) |
| DL | RA | AID=0 | (SA) |
| UL | BSSID | AID | |
| Direct | RA | AID | (DA) |

FIG. 17

| Data | | | | |
|---|---|---|---|---|
| Direction | From-AP | A1 (Rx) | A2 (Tx) | A3 (SA/DA) |
| DL | 1 | RA | AID | (SA) |
| UL | 0 | BSSID | AID | |
| Direct | 0 | RA | AID | (DA) |

| Field Name | Size in Bits | Size in Octets | Field Description |
|---|---|---|---|
| fc | 16 | | frame control |
| pra | 5 | | partial receiver address |
| pta | 11 | | partial transmitter address |
| aci | 2 | | access category index |
| hcs | 4 | | header check sequence |
| ccmp | 64 | 8 | counter-mode/cbc-mac protocol |
| ethertype | 16 | 2 | ethertype |
| mic | 64 | 8 | message integrity check |
| TOTAL SIZE: | 182 | 23 | |
| SIZE REDUCTION: | 61% | | |

| Field Name | Size in Bits | Field Description |
|---|---|---|
| pv | 2 | protocol version |
| type | 2 | frame type |
| subtype | 4 | frame subtype |
| to-ds | 1 | to distribution system |
| from-ds | 1 | from distribution system |
| more frag | 1 | more fragments |
| retry | 1 | retry |
| pm | 1 | power management |
| md | 1 | more data |
| pf | 1 | protected frame |
| order | 1 | order |
| TOTAL SIZE: | 16 | |

FIG. 18

| Field Name | Size in Bits | Size in Octets | Field Description |
|---|---|---|---|
| fc | 8 | | frame control |
| pra | 5 | | partial receiver address |
| pta | 11 | | partial transmitter address |
| aci | 2 | | access category index |
| hcs | 4 | | header check sequence |
| ccmp | 64 | 8 | counter-mode/cbc-mac protocol |
| ethertype | 16 | 2 | ethertype |
| mic | 64 | 8 | message integrity check |
| TOTAL SIZE: | 174 | 22 | |
| SIZE REDUCTION: | 63% | | |

| Field Name | Size in Bits | Field Description |
|---|---|---|
| pv | 2 | protocol version |
| type | 2 | frame type |
| a3 present | 1 | address 3 present |
| retry | 1 | retry |
| pm | 1 | power management |
| md | 1 | more data |
| TOTAL SIZE: | 8 | |

FIG. 19

| Field Name | Size in Bits | Size in Octets | Field Description |
|---|---|---|---|
| fc | 8 | | frame control |
| pta | 11 | | partial transmitter address |
| aci | 2 | | access category index |
| hcs | 4 | | header check sequence |
| ccmp | 64 | 8 | counter-mode/cbc-mac protocol |
| ethertype | 16 | 2 | ethertype |
| mic | 64 | 8 | message integrity check |
| TOTAL SIZE: | 169 | 21 | |
| SIZE REDUCTION: | 64% | | |

| Field Name | Size in Bits | Field Description |
|---|---|---|
| pv | 2 | protocol version |
| type | 2 | frame type |
| a3 present | 1 | address 3 present |
| retry | 1 | retry |
| pm | 1 | power management |
| md | 1 | more data |
| TOTAL SIZE: | 8 | |

FIG. 20

| Field Name | Size in Bits | Size in Octets | Field Description |
|---|---|---|---|
| fc | 8 | | frame control |
| pra | 5 | | partial receiver address |
| pta | 11 | | partial transmitter address |
| a3 | 48 | 6 | address 3 |
| aci | 2 | | access category index |
| hcs | 4 | | header check sequence |
| ccmp | 64 | 8 | counter-mode/cbc-mac protocol |
| ethertype | 16 | 2 | ethertype |
| mic | 64 | 8 | message integrity check |
| TOTAL SIZE: | 222 | 28 | |
| SIZE REDUCTION: | 52% | | |

| Field Name | Size in Bits | Field Description |
|---|---|---|
| pv | 2 | protocol version |
| type | 2 | frame type |
| a3 present | 1 | address 3 present |
| retry | 1 | retry |
| pm | 1 | power management |
| md | 1 | more data |
| TOTAL SIZE: | 8 | |

FIG. 21

| Field Name | Size in Bits | Size in Octets | Field Description |
|---|---|---|---|
| fc | 9 | | frame control |
| pra | 5 | | partial receiver address |
| pta | 11 | | partial transmitter address |
| aci | 2 | | access category index |
| hcs | 4 | | header check sequence |
| ccmp | 64 | 8 | counter-mode/cbc-mac protocol |
| ethertype | 16 | 2 | ethertype |
| mic | 64 | 8 | message integrity check |
| TOTAL SIZE: | 175 | 22 | |
| SIZE REDUCTION: | 62% | | |

| Field Name | Size in Bits | Field Description |
|---|---|---|
| pv | 2 | protocol version |
| type | 2 | frame type |
| a3 present | 1 | address 3 present |
| compr a3 | 1 | compressed a3 present |
| retry | 1 | retry |
| pm | 1 | power management |
| md | 1 | more data |
| TOTAL SIZE: | 9 | |

FIG. 22

| Field Name | Size in Bits | Size in Octets | Field Description |
|---|---|---|---|
| fc | 9 | | frame control |
| pta | 11 | | partial transmitter address |
| aci | 2 | | access category index |
| hcs | 4 | | header check sequence |
| ccmp | 64 | 8 | counter-mode/cbc-mac protocol |
| ethertype | 16 | 2 | ethertype |
| mic | 64 | 8 | message integrity check |
| TOTAL SIZE: | 170 | 22 | |
| SIZE REDUCTION: | 63% | | |

| Field Name | Size in Bits | Field Description |
|---|---|---|
| pv | 2 | protocol version |
| type | 2 | frame type |
| a3 present | 1 | address 3 present |
| compr a3 | 1 | compressed a3 present |
| retry | 1 | retry |
| pm | 1 | power management |
| md | 1 | more data |
| TOTAL SIZE: | 9 | |

FIG. 23

| Field Name | Size in Octets | Field Description |
|---|---|---|
| fc | 2 | frame control |
| dur | 2 | duration |
| a1 | 6 | address 1 |
| fcs | 4 | frame control sequence |
| TOTAL SIZE: | 14 | |

| Field Name | Size in Bits | Field Description |
|---|---|---|
| pv | 2 | protocol version |
| type | 2 | frame type |
| subtype | 4 | frame subtype |
| to-ds | 1 | to distribution system |
| from-ds | 1 | from distribution system |
| more frag | 1 | more fragments |
| retry | 1 | retry |
| pm | 1 | power management |
| md | 1 | more data |
| pf | 1 | protected frame |
| order | 1 | order |
| TOTAL SIZE: | 16 | |

FIG. 26

| Field Name | Size in Bits | Size in Octets | Field Description |
|---|---|---|---|
| fc | 9 | | frame control |
| hcs | 4 | | header check sequence |
| TOTAL SIZE: | 13 | 2 | |
| SIZE REDUCTION: | 88% | | |

| Field Name | Size in Bits | Field Description |
|---|---|---|
| pv | 2 | protocol version |
| type | 2 | frame type |
| a3 present | 1 | address 3 present |
| compr a3 | 1 | compressed a3 present |
| retry | 1 | retry |
| pm | 1 | power management |
| md | 1 | more data |
| TOTAL SIZE: | 9 | |

FIG. 27

| Field Name | Size in Bits | Size in Octets | Field Description |
|---|---|---|---|
| fc | 9 | | frame control |
| pra | 5 | | partial receiver address |
| hcs | 4 | | header check sequence |
| TOTAL SIZE: | 18 | 2 | |
| SIZE REDUCTION: | 84% | | |

| Field Name | Size in Bits | Field Description |
|---|---|---|
| pv | 2 | protocol version |
| type | 2 | frame type |
| a3 present | 1 | address 3 present |
| compr a3 | 1 | compressed a3 present |
| retry | 1 | retry |
| pm | 1 | power management |
| md | 1 | more data |
| TOTAL SIZE: | 9 | |

FIG. 28

| Frame Control | bits | |
|---|---|---|
| 3002 — pv | 2 | Protocol Value (1) |
| 3004 — type | 4 | Frame Type (16 total) |
| 3006 — from-ap | 1 | From-AP |
| 3008 — ac | 2 | Access Category |
| 3010 — retry | 1 | Retry |
| 3012 — pm | 1 | Power Management |
| 3014 — md | 1 | Mode Data |
| 3016 — pf | 1 | Protected Frame (0) |
| 3018 — a-msdu | 1 | A-MSDU |
| 3020 — eosp | 1 | End of Service Period |
| 3022 — a3 present | 1 | A3 present |
| total | 16 | |

3000

| MPDU | octets | |
|---|---|---|
| 3000 — fc | 2 | Frame Control (PV=1) |
| 3052 — aid | 13 bits | AID (T-AID or R-AID)* |
| 3054 — efc | 3 bits | Extended FC (reserved) |
| 3056 — ta/ra | 6 | RA or TA** |
| 3058 — a3 | | SA or DA*** |
| 3060 — sn | 2 | Sequence Number |
| total | 12 | |

| bits | Description |
|---|---|
| 3002a — 2 | Protocol Value (0) |
| 3004a — 2 | Frame Type |
| 3005a — 4 | Frame subtype |
| 3006a — 1 | From-AP |
| 3012a — 1 | Power Management |
| 3014a — 1 | Mode Data |
| 3016a — 1 | Protected Frame (0) |
| 3018a — 1 | A-MSDU |
| 3020a — 1 | End of Service Period |
| 3022a — 1 | A3 present |
| 3024a — 1 | More PPDU/RDG |
| 16 | |

3000a

| octets | |
|---|---|
| 3000a — 2 | Frame Control (PV=1) |
| 3052a — 13 bits | AID (T-AID or R-AID)* |
| 3054a — 3 bits | Reserved |
| 3056a — 6 | RA or TA** |
| 3058a — | SA or DA*** |
| 3060a — 2 | Sequence Control |
| 12 | |

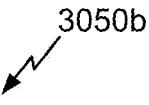
FIG. 30B

| Frame Control | bits | |
|---|---|---|
| 2202 — pv | 2 | Protocol Value (1) |
| 2204 — type | 4 | Frame Type (16 total) |
| 2206 — from-ap | 1 | From-AP |
| 2208 — ac | 2 | Access Category |
| 2210 — retry | 1 | Retry |
| 2212 — pm | 1 | Power Management |
| 2214 — md | 1 | Mode Data |
| 2216 — pf | 1 | Protected Frame (1) |
| 2218 — a-msdu | 1 | A-MSDU |
| 2220 — eosp | 1 | End of Service Period |
| 2222 — a3 present | 1 | A3 present |
| total | 16 | |

3100

| MPDU | octets | |
|---|---|---|
| 2200 — fc | 2 | Frame Control (PV=1) |
| 2252 — aid | 13 bits | AID (T-AID or R-AID)* |
| 2254 — efc | 3 bits | Extended FC (reserved) |
| 2256 — ta/ra | 6 | RA or TA** |
| 2258 — a3 | | SA or DA*** |
| 2260 — sn | 2 | Sequence Number |
| 3162 — ppn | 2 | Packet PN |
| 3164 — mic | 8 | MIC |
| total | 22 | |

3150

FIG. 31

APPARATUS AND METHODS FOR MEDIA ACCESS CONTROL HEADER COMPRESSION

CROSS REFERENCE TO RELATED APPLICATION(S)

This application claims the benefit of U.S. Provisional Application Nos. 61/487,814, filed May 19, 2011, 61/506,779, filed Jul. 12, 2011, 61/514,365, filed Aug. 2, 2011, 61/566,535, filed Dec. 2, 2011, 61/569,653, filed Dec. 12, 2011, 61/579,179, filed Dec. 22, 2011, 61/584,419, filed Jan. 9, 2012, 61/588,706, filed Jan. 20, 2012, 61/595,487, filed Feb. 6, 2012, 61/602,754, filed Feb. 24, 2012, 61/606,271, filed Mar. 2, 2012, 61/637,042, filed Apr. 23, 2012, and 61/642,252, filed May 5, 2012, the entire content of each of which is incorporated herein by reference

BACKGROUND

Field

The present application relates generally to wireless communications, and more specifically to systems, methods, and devices for compressing media access control (MAC) headers for communication.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network may transmit/receive information between each other. The information may comprise packets, which in some aspects may be referred to as data units or data frames. The packets may include overhead information (e.g., header information, packet properties, etc.) that helps in routing the packet through the network, identifying the data in the packet, processing the packet, etc., as well as data, for example user data, multimedia content, etc. as might be carried in a payload of the packet.

Accordingly, the header information is transmitted with packets. Such header information may comprise a large portion of a data packet. Accordingly, transmission of data in such packets may be inefficient due to the fact that much of the bandwidth for transmitting data may be used to transmit header information as opposed to the actual data. Thus, improved systems, methods, and devices for communicating packets are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size of a frame header (e.g., media access control (MAC) header) of a data packet, thereby reducing the overhead in transmitting payloads in data packets.

One aspect of the disclosure provides a method of communicating in a wireless network, the method comprising: generating a data packet including a local identifier of either a transmitter of the data packet or a receiver of the data packet based on a direction in which the data packet is sent, and a global identifier of the other of the transmitter of the data packet and the receiver of the data packet based on a direction in which the data packet is sent; and transmitting the data packet.

Another aspect of the disclosure provides an apparatus for communicating in a wireless network. The apparatus comprises a processor configured to generate a data packet including a local identifier of either a transmitter of the data packet or a receiver of the data packet based on a direction in which the data packet is sent, and a global identifier of the other of the transmitter of the data packet and the receiver of the data packet based on a direction in which the data packet is sent. The apparatus comprises a transmitter configured to transmit the data packet.

Another aspect of the disclosure provides an apparatus for communicating in a wireless network. The apparatus comprises means for generating a data packet including a local identifier of either a transmitter of the data packet or a receiver of the data packet based on a direction in which the data packet is sent, and a global identifier of the other of the transmitter of the data packet and the receiver of the data packet based on a direction in which the data packet is sent; and means for transmitting the data packet.

Another aspect of the disclosure provides a computer-readable medium comprising instructions that when executed by a computer cause the computer to perform a method of communicating in a wireless network. The method comprises: generating a data packet including a local identifier of either a transmitter of the data packet or a receiver of the data packet based on a direction in which the data packet is sent, and a global identifier of the other of the transmitter of the data packet and the receiver of the data packet based on a direction in which the data packet is sent; and transmitting the data packet.

BRIEF DESCRIPTION OF THE DRAWINGS

FIG. 3A illustrates another example of a media access control (MAC) header of a type used in legacy systems for communication.

FIG. 5 illustrates examples of the type of data in the fields of the compressed MAC header of FIG. 4 for a data packet, and the data for a corresponding acknowledgement according to one aspect of the MAC header of FIG. 4.

FIG. 6 illustrates examples of the type of data in the fields of the compressed MAC header of FIG. 4 for a data packet, and the data for a corresponding acknowledgement according to another aspect of the MAC header of FIG. 4.

FIG. 7 illustrates examples of the type of data in the fields of the compressed MAC header of FIG. 4 for a data packet, and the data for a corresponding acknowledgement according to another aspect of the MAC header of FIG. 4.

FIG. 8 illustrates examples of the type of data in the fields of the compressed MAC header of FIG. 4 for a data packet, and the data for a corresponding acknowledgement according to another aspect of the MAC header of FIG. 4.

FIG. 9 illustrates examples of the type of data in the fields of the compressed MAC header of FIG. 4 for a data packet, and the data for a corresponding acknowledgement according to another aspect of the MAC header of FIG. 4.

FIG. 10 illustrates examples of the type of data in the fields of the compressed MAC header of FIG. 4 for a data packet, and the data for a corresponding acknowledgement according to another aspect of the MAC header of FIG. 4.

FIG. 11 illustrates examples of the type of data in the fields of the compressed MAC header of FIG. 4 for a data packet, and the data for a corresponding acknowledgement according to another aspect of the MAC header of FIG. 4.

FIG. 12 illustrates examples of the type of data in the fields of the compressed MAC header of FIG. 4 for a data packet, and the data for a corresponding acknowledgement according to another aspect of the MAC header of FIG. 4.

FIG. 13 illustrates examples of the data in the fields of the compressed MAC header used in request-to-send (RTS)/clear-to-send (CTS) addressing.

FIG. 14 illustrates examples of the type of data in the fields of the compressed MAC header for a management frame, and the data for a corresponding acknowledgement according to another aspect of the MAC header.

FIG. 15 illustrates examples of the type of data in the fields of the compressed MAC header for a data packet, and the data for a corresponding acknowledgement according to another aspect of the MAC header.

FIG. 16 illustrates further examples of the type of data in the fields of the compressed MAC header for a data packet.

FIG. 17 illustrates further examples of the type of data in the fields of the compressed MAC header for a data packet.

FIGS. 18-23 illustrate examples of types of compressed MAC headers.

FIG. 26 illustrates an example of an acknowledgment (ACK) frame of a type used in legacy systems for communication.

FIGS. 27 and 28 illustrate examples of types of compressed ACK frames.

FIG. 30 illustrates an example of a frame control field format and a compressed MAC header format for a compressed MAC header packet without security.

FIG. 30A illustrates another example of a frame control field format and a compressed MAC header format for a compressed MAC header packet without security.

FIG. 30B illustrates another example of a frame control field format and a compressed MAC header format for a compressed MAC header packet.

FIG. 31 illustrates an example of a frame control field format and a compressed MAC header format for a compressed MAC header packet with security.

DETAILED DESCRIPTION

Figure 1:
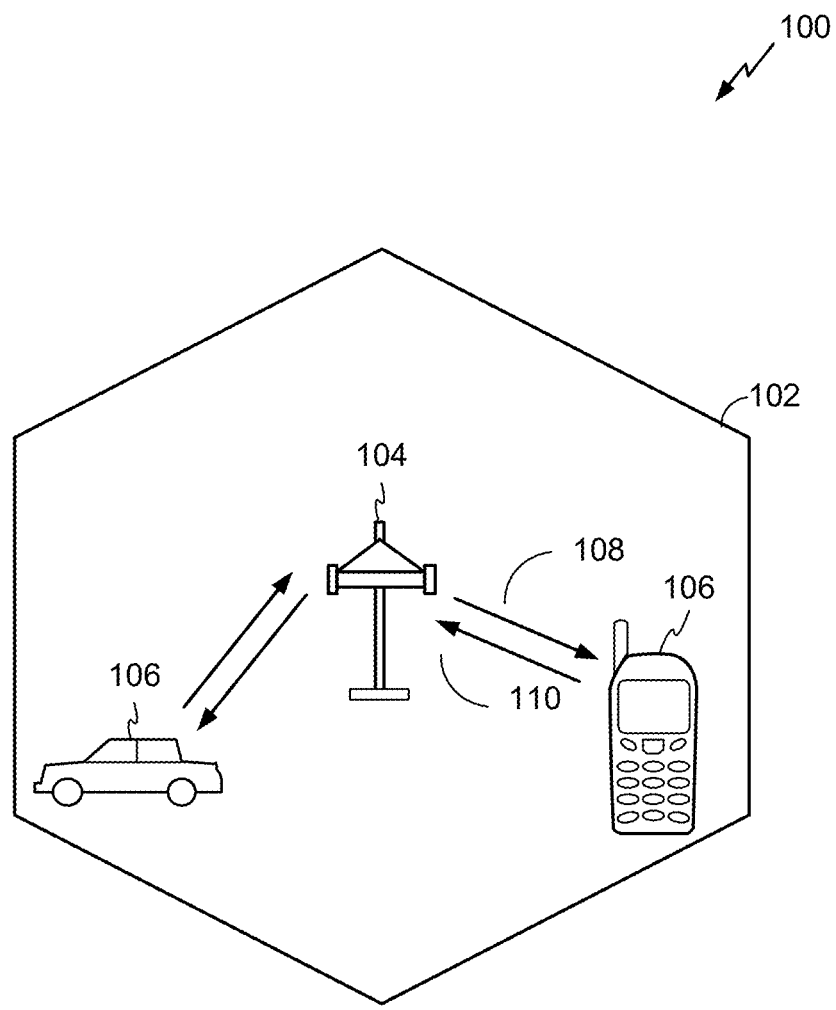
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. Further, in some aspects, STAs 106 may communicate directly with each other and form a direct link (direct) between each other.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. In another example, the functions of the AP 104 described herein may alternatively be performed by one or more of the STAs 106.

Figure 2:
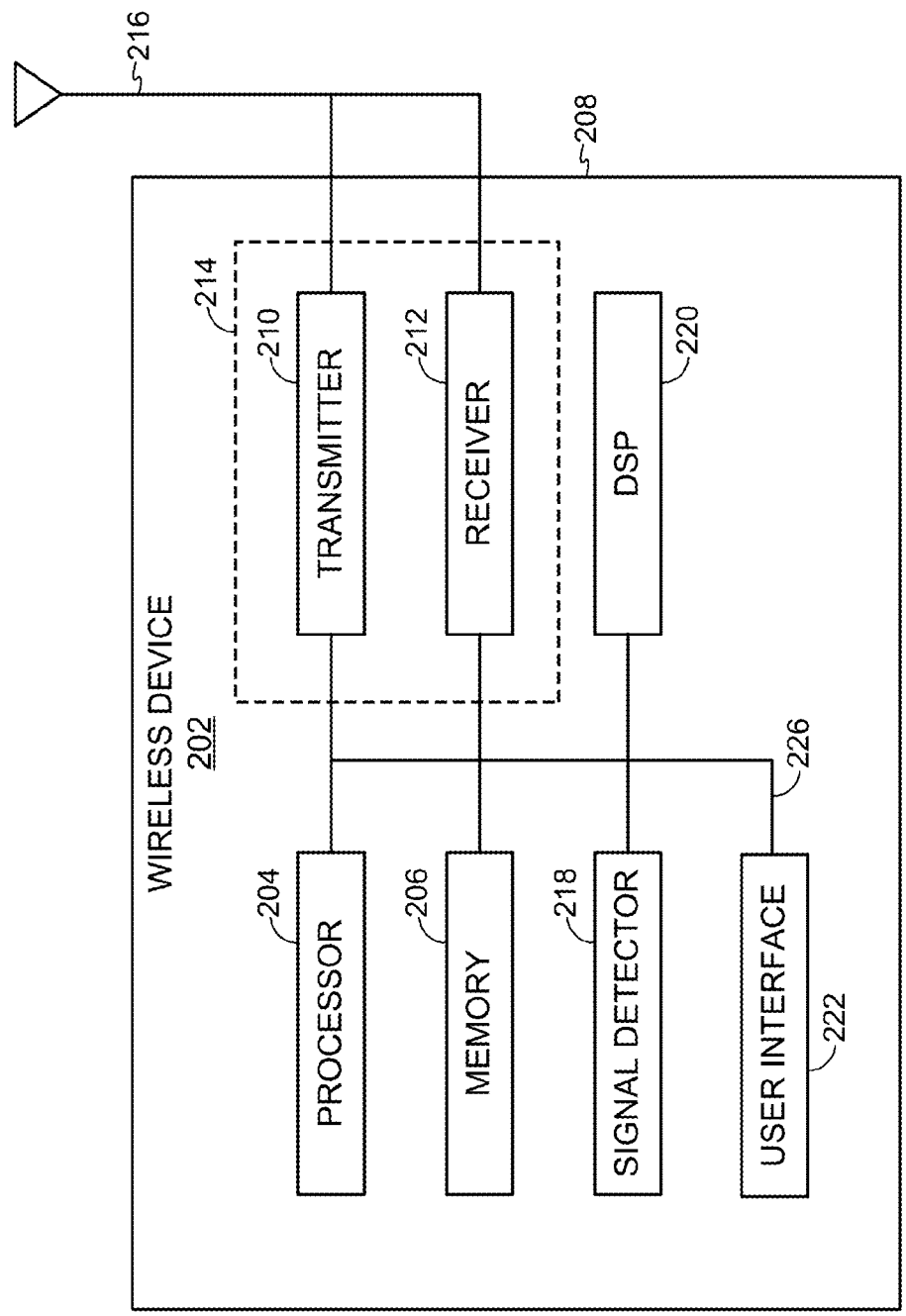
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use, as discussed in further detail below.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header accordingly as further discussed below.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly, as discussed in further detail below.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106, and may be used to transmit and/or receive communications having a plurality of MAC header types.

Figure 3:
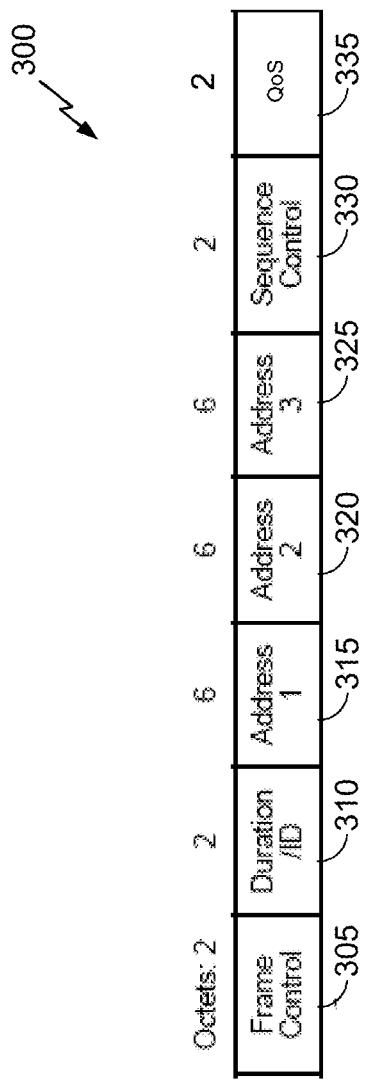
FIG. 3 illustrates an example of a media access control (MAC) header of a type used in legacy systems for communication.

FIG. 3 illustrates an example of a legacy MAC header 300. The MAC header 300 may be a non-compressed MAC header. As shown, the MAC header 300 includes 7 different fields: a frame control (fc) field 305, a duration/identification (dur) field 310, a receiver address (a1) field 315, a transmitter address (a2) field 320, a destination address (a3) field 325, a sequence control (sc) field 330, and a quality of service (QoS) control (qc) field 335. Each of the a1, a2, and a3 fields 315-325 comprises a full MAC address of a device, which is a 48-bit (6 octet) value. FIG. 3 further indicates the size in octets of each of the fields 305-335. Summing the value of all of the field sizes gives the overall size of the MAC header 300, which is 26 octets. The total size of a given packet may be on the order of 200 octets. Therefore, the legacy MAC header 300 comprises a large portion of the overall packet size, meaning the overhead for transmitting a data packet is large.

FIG. 3A illustrates an example of a MAC header 300a, which is a 3-address MAC header using counter-mode with cipher block chaining message authentication code protocol (CCMP) encryption, of a type used in legacy systems for communication. As shown, the MAC header 300 includes 13 different fields: a frame control (fc) field 305a, a duration/identification (dur) field 310a, a receiver address (a1) field 315a, a transmitter address (a2) field 320a, a destination address (a3) field 325a, a sequence control (sc) field 330a, a quality of service (QoS) control (qc) field 335a, a high throughput (ht) control field 340a, a CCMP (ccmp) field 345a, a logical link control (LLC)/subnetwork access protocol (SNAP) (llc/snap) field 350a, a message integrity check (mic) field 360a, and a frame control sequence (fcs) field 365a. FIG. 3 further indicates the size in octets of each of the fields 305a-365a. Summing the value of all of the field sizes gives the overall size of the MAC header 300a, which is 58 octets. The total size of a given packet may be on the order of 200 octets. Therefore, the legacy MAC header 300a comprises a large portion of the overall packet size, meaning the overhead for transmitting a data packet is large.

FIG. 3A further illustrates the types of data included in the fc field 305a of the MAC header 300a. The fc field 305a includes the following: a protocol version (pv) field 372, a frame type (type) field 374, a frame subtype (subtype) field 376, a to distribution system (to-ds) field 378, a from distribution system (from-ds) field 380, a more fragments (more frag) field 382, a retry field 384, a power management (pm) field 386, a more data (md) field 388, a protected frame (pf) field 390, and an order field 392.

Accordingly, systems and methods for using MAC headers of reduced size (compressed MAC headers) for data packets are described herein. The use of such compressed MAC headers allows for less space in a data packet to be used by the MAC header, thereby reducing the overhead needed to transmit the payload in a data packet. Thus, less data needs to be transmitted overall. Less transmission of data can increase the speed with which data is transmitted, can reduce the use of bandwidth by a transmitter, and can reduce the power needed for transmission as fewer resources are used to transmit less data.

Compression of MAC headers may be performed by removing or modifying certain fields of the MAC header. The compressed MAC header may then be sent from the wireless device 202t to the wireless device 202r. Removal or modification of the fields may be based on the information that needs to be communicated to the wireless device 202r of the data packet. For example, the wireless device 202r may not need all the information in the MAC header 300 to receive and process the data packet. For example, in some cases the receiver may already have some of the information stored in memory that would be transmitted in the MAC header 300. In one case, the wireless device 202r may have received that information in a previously received data packet from the wireless device 202t, such as in the MAC header of the previous data packet or a messaging packet. In another case, the wireless device 202r may have such information pre-programmed such as at the time of manufacture, or through communication with another device. In some aspects, the wireless device 202r may indicate to the wireless device 202t information (e.g., values for fields of the MAC header) that is stored at the wireless device 202r. The wireless device 202t may then omit such fields from the MAC header in packets sent to the wireless device 202r.

In yet another embodiment, the wireless device 202r may not perform certain functions that would require the use of fields that have been removed, for example in cases where such functionality is not needed. Below are described some of the fields that may be removed or modified and how the wireless device 202r would function with such a compressed MAC header. In some embodiments, the wireless device 202r can determine the format of the MAC header used based on an indication in the MAC header of the format used as further discussed in detail below. In other embodiments, the wireless device 202r and 202t utilize only one type of compressed MAC header and accordingly no indication is needed of which type of MAC header is used is needed.

In the legacy 802.11 standard (up to and including 802.11 ad), a protocol version (pv) subfield of the fc field is always set to 0, since protocol version 0 (PV0) is the only defined protocol version. Accordingly, the use of other values for the protocol version, i.e., 1 (PV1), 2 (PV2), and 3 (PV3), is not defined. Therefore, the systems and methods discussed herein may define compressed MAC headers as part of protocol version 1 (PV1), PV2, and/or PV3. The protocol versions may be used interchangeably by devices for communication. For instance, PV0 defining use of a legacy MAC header may be used for setting up a link, negotiating capabilities, and high speed data transfers. Further, PV1, PV2, and/or PV3 defining use of a compressed MAC header may be used for periodic short data transmissions when in power save mode.

In some embodiments, the compressed format MAC header may use the existing protocol version 0 (PV0) or the newly defined protocol version 1 (PV1), PV2, and/or PV3. The use of PV1, PV2, and/or PV3 may avoid a situation where legacy devices attempt to parse a received data packet based on the formatting of a legacy PV0 frame. For example, legacy devices may attempt to match the last 4 octets of the data packet to a frame control sequence (FCS). When it does match, the legacy devices may use the value of the data that is in the position of the legacy duration field to update their network allocation vector (NAV), even though there may not be a duration field at that location in the packet. The odds for such a false positive detection to occur may be high enough to cause glitches or jitter at legacy nodes, which may warrant the use of PV1, PV2, and/or PV3 for the compressed MAC header formats. The use of compressed MAC headers is further discussed below.

In one embodiment, certain fields of a MAC header (e.g., MAC header 300 or 300a) can be reused for a variety of purposes, thus removing the need to include certain other fields in the MAC header, thereby forming a compressed MAC header. For example, the mic field 360a contains a short piece of information that is used to authenticate a message. The information contained in the mic field 360a may be generated by inputting into an authentication algorithm running at the wireless device 202t both the data to be sent to the wireless device 202r and a secret key shared with the wireless device 202r. The authentication algorithm then generates the information to be sent in the mic field 360a. The authentication algorithm may be a hash function. The wireless device 202r may also be running the authentication algorithm. The wireless device 202r receives the message from the wireless device 202t and inputs into the authentication algorithm the received message and its copy of the shared key. If the output of the authentication algorithm at the wireless device 202r matches the information contained in the mic field 360a, the wireless device 202r can determine the integrity of the data transmitted in the data packet (e.g., whether the packet has been tampered with) as well as the authenticity of the data packet (e.g., a check on the sender of the data packet). In one embodiment, the addressing fields, a1 field 315a and a2 field 320a, can be removed and the mic field 360a can be utilized instead for addressing purposes. In particular, addressing can be implied by checking to see if the data packet in combination with the key held by the wireless device input into the authentication algorithm generates the same data as in the mic field 360a. For example, only an intended receiver holds the correct key for input along with the data packet into the authentication algorithm to produce the correct output. Therefore, if the wireless device 202r is the intended receiver, it will have the correct key and produce the correct output. If it is not the intended receiver, the wireless device 202r will not produce the correct output. Accordingly, the correct receiver can be known based on the mic field 360a without using the receiver address a1.

It should be noted however, that without a receiver address a1, the wireless device 202r will always need to run the authentication algorithm on any incoming data packets to determine if it is the intended receiver. This can require additional processing power, which requires additional battery consumption. In some embodiments, therefore, a new field may be added to the MAC header 300 or 300a, such as a partial receiver address (PRA). The PRA may be a portion of the receiver address a1. The PRA may not uniquely identify the receiving device, but it does help to at least indicate in some cases to the wireless device 202r that a data packet is not intended for the wireless device 202r. Therefore, the wireless device 202r may run the authentication algorithm for fewer data packets. In other embodiments, the PRA or the receiver address (RA) itself may already be present in a physical layer protocol (PHY) header of the data packet and therefore does not need to additionally be included in the MAC header 300 or 300a.

In addition, the identity of the transmitting device can be determined based on whether the authentication algorithm produces the correct output without the use of the transmitter address a2. For example, the key held by the wireless device 202t for use in the authentication algorithm is different for different wireless devices. Accordingly, the key held by the wireless device 202r is specific to the wireless device 202t. Therefore, if the wireless device 202t is the transmitting device, the specific key held by the wireless device 202r for communication with the wireless device 202t input into the authentication algorithm will produce the correct output. If the wireless device 202t is not the transmitting device, the input will not produce the correct output.

It should be noted that the wireless device 202r holds many different keys for many different transmitting devices. This can require the wireless device 202r to try running the authentication algorithm with many different keys until an appropriate output is found, or it is determined none of the keys match. This can require additional processing power, which requires additional battery consumption. In some embodiments, therefore, a new field may be added to the MAC header 300 or 300a, such as a partial transmitter address (PTA). The PTA may be a portion of the transmitter address a2. The PTA may not uniquely identify the transmitting device, but it does help to at least indicate in some cases to the wireless device 202r that some keys need not be tested as possibilities of keys held for the transmitting device. Therefore, the wireless device 202r will need to run the authentication algorithm for fewer keys. In another embodiment, the PTA may uniquely identify a key at the receiving device. An example of such a PTA is the association identifier (AID) that is assigned by access points (APs) to each of its associated STAs. The AIDs are unique amongst STAs associated with the AP, hence the AP can uniquely identify the correct key for use in the authentication algorithm based on the received AID. Since the AID is much shorter than a MAC address, the MAC header will be reduced in size.

Further, the address fields can be used as part of the input in the authentication algorithm at both the wireless device 202t and the wireless device 202r, without being included in the MAC header itself. Accordingly, the wireless device 202r receiving a data packet from the wireless device 202r, may input its own address as the receiver address a1 into the authentication algorithm along with the received data packet and the key. If the output matches the value of the mic field 360a of the data packet, the wireless device 202r knows that it is the receiving device as the mic field 360a was calculated with the same receiver address a1 by the wireless device 202t.

In another embodiment, a packet number included in the ccmp field 345a can be used for sequence control of packets by being used as the sequence number included in the sc field 330a. Therefore, the sc field 330 or 330a can be removed from the MAC header 300 or 300a.

In another embodiment, such as where short packets are used and/or relatively low PHY rates are used for transmission, the size of the packet number field in the ccmp field 345a and/or the mic field 360a can be reduced.

In another embodiment, the mic field 360a can be used to perform the function of the fcs field 365a. The fcs field 365a contains a cyclic redundancy check, which is used to determine whether there are any errors in the packet as received. Instead of performing this check when receiving a packet, the wireless device 202r can be configured to check to see if the data packet passes the authentication algorithm by generating the data of the mic field 360a. If there are errors in the packet, the authentication algorithm will not pass. However, if the packet does pass the authentication algorithm, it can be assumed that there are no errors in the packet. Such determination may further be made in combination with checking a packet number of the data packet to see if that packet number is logically expected as the packet number at that time. It should be noted that if the authentication algorithm passes, it triggers the wireless device 202r to respond back (e.g., with an ACK frame) after short inter-frame space (SIFS) time, which is typical for the appropriate STA. However, if the authentication algorithm does not pass, it triggers the wireless device 202r to respond back after an extended inter-frame space (EIFS) time. This, however, it not problematic as it is cleared by the next acknowledgment (ACK) frame that is sent.

In another embodiment, the destination address (a3) field 325 or 325a can be removed from the MAC header 300 or 300a. The destination address may be used in cases where the wireless device 202t transmits a data packet to the wireless device 202r via another device (e.g., a router) and indicates the address of the other device as the destination address. Accordingly, for instances where the wireless device 202t transmits directly to the wireless device 202r, the a3 field 325 or 325a can be removed from the MAC header 300 or 300a. In some embodiments, a new field "a3 present" can be added to the MAC header 300 or 300a to indicate whether or not the a3 field 325 or 325a is present in the MAC header 300 or 300a.

In some embodiments, a frequently used destination address can be stored in the memory of the wireless device 202r. Accordingly, instead of including the entire destination address, the MAC header 300 or 300a can include a new field called a compressed a3 present or "compr a3" field, which indicates to the wireless device 202r that it should utilize the stored destination address as the destination address for the data packet. The stored destination address could be pre-programmed at the wireless device 202r. Additionally or alternatively, the stored destination address could be set and/or updated by messaging between the wireless device 202t and the wireless device 202r that indicates a new destination address should be stored.

In another embodiment, the dur field 310 or 310a can be removed from the MAC header 300 or 300a. The dur field 310 or 310a indicates to the receiver the duration that the communication channel between the wireless device 202t and the wireless device 202r is to be maintained. The intended wireless device 202r receiving the data packet will typically keep the communication channel open with the wireless device 202t for the time indicated in the dur field 310 or 310a when receiving the packet. Instead of using the dur field 310 or 310a, the wireless devices 202t and 202r can utilize standard request to send/clear to send (RTS/CTS) messaging, as is known in the art, to maintain a communications channel. In another embodiment, the dur field 310 or 310a may be included in the MAC header 300 or 300a for a first packet sent to the wireless device 202r, but excluded in additional packets sent during the time specified in the dur field 310 or 310a.

In another embodiment, instead of including the entire llc/snap field 350a, only a portion of the llc/snap field 350a may be included in the MAC header 300 or 300a. For example, for the majority of the frames sent, the llc/snap field 350a data is the same, except for the ethertype. Accordingly, only the ethertype, instead of the entire llc/snap field 350a, may be included in the MAC header 300 or 300a. Alternatively, the entire LLC/SNAP header may be stored in memory at the receiver, and a "compr llc/snap" field may indicate that the stored LLC/SNAP header is to be used for the received packet, similar to the discussion of the compr a3 field.

In another embodiment, certain portions of the fc field 305 or 305a may be removed from the MAC header 300 or 300a. For example, data fields like the Aggregated Mac Service Data Unit (A-MSDU), Aggregated Mac Protocol Data Unit (A-MPDU), fragmentation, and ACK policy fields may be removed from the fc and qc fields 305, 305a, and/or 335a, thereby reducing the possible functionalities of the compressed MAC header (i.e. the compressed MAC header can be used when their functionality is not needed). Additionally or alternatively, the qc field 335a and/or the ht control field 340a may be removed in their entirety from the MAC header 300 or 300a when their functionality is not needed. In some embodiments, the wireless device 202t and the wireless device 202r may be configured to always use encryption for communications. Accordingly, the bit in the fc field 305 or 305a that indicates whether encryption is used for the packet may be removed. In some embodiments, the frame types may be limited to 4 (e.g., data, ACK, an additional type, and an escape code), thus reducing the size of the frame type field in the fc field 305 or 305a.

Figure 4:
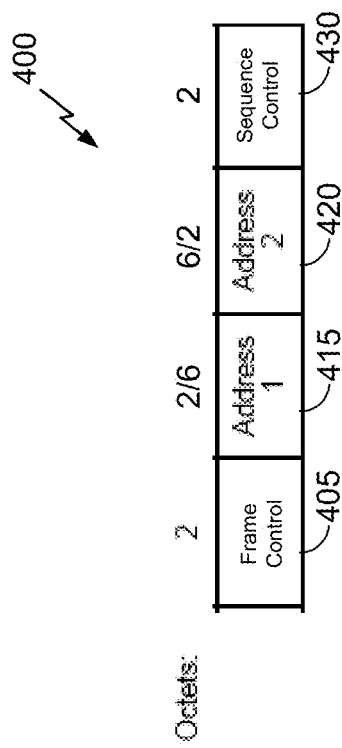
FIG. 4 illustrates an example of a compressed MAC header.

FIG. 4 illustrates an example of a compressed MAC header 400. As shown, the MAC header 400 includes 4 different fields: a frame control (fc) field 405, a first address (a1) field 415, a second address (a2) field 420, and a sequence control (sc) field 430. FIG. 4 further indicates the size in octets of each of the fields 405-430. Summing the value of all of the field sizes gives the overall size of the MAC header 400, which is 12 octets (a 54% reduction in size from the legacy MAC header 300). As shown, one of the a1 field 415 and the a2 field 420 is 6 octets in length, while the other is 2 octets in length as further discussed below. The various fields of the MAC header 400 may be utilized according to several different aspects described below.

As shown in the MAC header 400, the dur field 310 may be omitted. Normally, a device receiving a data packet will decode at least the dur field 310, which indicates a time the device should not transmit so there are no interfering transmissions during the transmit opportunity. Instead of the dur field 310, devices may be configured to not transmit data after receiving a data packet that requires an acknowledgement until a time for such acknowledgement has passed. Such acknowledgement may be an ACK or BA, indicating the packet has been received. The devices may only be configured to defer transmission until an ACK may have been received for the packet if a field (e.g., an ACK policy field) in the packet indicates that the device should defer until an ACK is received. The field may be included in the MAC header or PHY header of the packet. The transmission of the response frame may be hidden for a STA that observes the data packet causing the response frame to be sent, but the indication in the data packet that an ACK may be present causes the observing STA to defer after the end of the data packet until the response frame may have been transmitted by the STA that is the destination of the data packet.

Figure 4A:
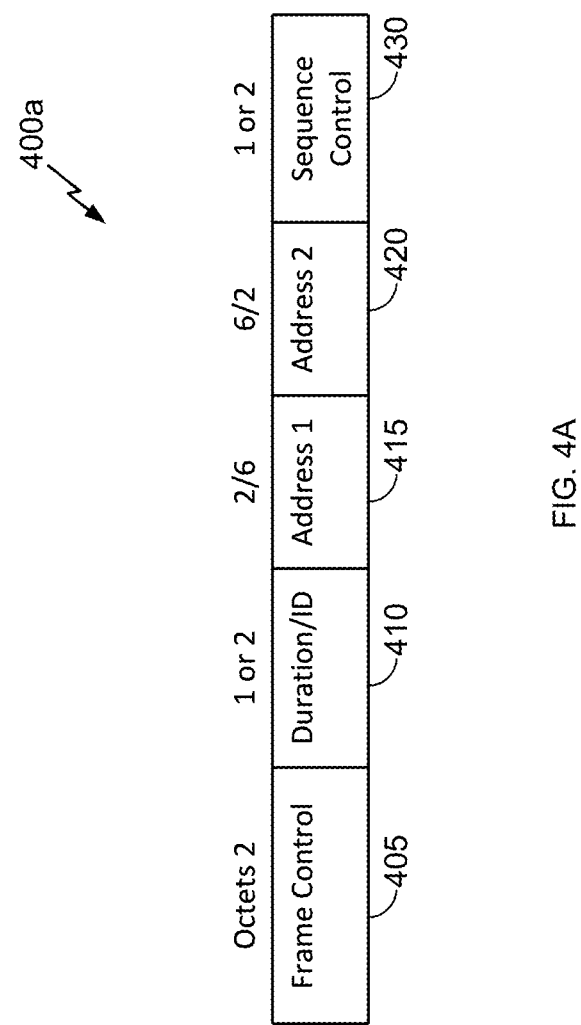
FIG. 4A illustrates an example of another compressed MAC header.

FIG. 4A illustrates an example of another compressed MAC header 400a. The MAC header 400a includes the same fields as the MAC header 400, but unlike the MAC header 400, also includes a duration/identification (dur) field 410. As shown, the compressed MAC header 400a includes 5 different fields: a frame control (fc) field 405, a duration/identification (dur) field 410, a first address (a1) field 415, a second address (a2) field 420, and a sequence control (sc) field 430. FIG. 4 further indicates the size in octets of each of the fields 405-430. It should be noted that the use of the fields other than the dur field 410 of the MAC header 400a may be used in the same or similar manner as discussed herein with respect to MAC header 400.

In some aspects, the dur field 410 may have a length of 2 octets, similar to the dur field 310 of the MAC header 300. In some aspects, the dur field 410 may have a reduced length as compared to the dur field 310. For example, the dur field 410 may have a length of 15 bits or less. The value of the dur field 410 may indicate the duration of the data packet in which the MAC header 400a is transmitted/received. In some aspects, the value may indicate the duration as multiples of a pre-defined value (e.g., a value expressed in microseconds). In some aspects, the value may be selected to cover one or more transmit opportunity (TX-OP) periods. The length of the dur field 410 may therefore be based on the pre-defined value and the duration of a TX-OP period. For example, if the predefined value is 96 µs and one TX-OP period is 24.576 ms then the duration field length may be of 8 bits (e.g., $\log_2[(\text{TX-OP period})/(\text{pre-define value})]$) such that the maximum value of the duration field covers at least on TX-OP period.

Further, as discussed below, all the bits in the 2 octet length a1 or a2 field may not be used, as only 13-bits may be used. The other three bits may be utilized for other purposes. For example, the traffic ID (TID) may be included in the 2 octet length a1 or a2 field instead of in the fc field.

In some aspects, instead of using a globally unique identifier for a device (e.g., MAC address) for both the a1 field 415 and the a2 field 420 as is used in the legacy MAC header 300, one of the a1 field 415 or the a2 field 420 uses a local identifier, such as an association identifier (AID), that uniquely identifies a device in a particular BSS, but does not necessarily uniquely identify the device globally. Accordingly, one of the a1 field 415 or the a2 field 420 may be 2 octets in length to accommodate the shorter local identifier, as opposed to 6 octets in length as needed for the global identifier. This helps reduce the size of the MAC header 400. In some aspects, the selection of which of the a1 field 415 and the a2 field 420 includes a local identifier or a global identifier is based on the device sending the packet and the device receiving the packet. For example, the selection may be different for packets sent on each of a downlink from an AP to an STA, an uplink from an STA to an AP, and a direct link from one STA to another STA. Each of FIGS. 5-13 illustrates tables of alternative example selections. One or more of the examples of FIGS. 5-13 may be used for communication in a given network. For example, one example described may be used for sending packets and acknowledgement messages that are not block acknowledgments, and another example may be used for sending packets and acknowledgment messages that are block acknowledgments in the same network.

In some aspects, certain bits of fields of the MAC header 400 may be used for other purposes than used for in the MAC header 300 to indicate and provide certain capabilities. In particular, providing certain capabilities may require a certain number of bits be used for signaling. The following are examples of bits that may be used to provide such signaling. For example, when the a1 field 415 or the a2 field 420 uses a local identifier such as an AID, there may be reserved bits (e.g., 3 reserved bits) that may be utilized to provide certain capabilities. Further, some, e.g., 2, bits of the fc field 405 may be overloaded in that they are used to indicate more than one piece of information to provide certain capabilities. For example, the order bit and the to-ds bit (such as by merging uplink and direct communication signaling) may be overloaded. In addition, certain bits of the sc field 430 may be used to provide certain capabilities. For example, 4 bits from a fragment number subfield may be used to provide certain capabilities and up to 2^3 bits from a sequence number subfield can be used to provide certain capabilities. Further, 1-bit from the more fragment subfield in the fc field 405 may be used to provide certain capabilities. In another example, a new field can be defined to provide certain capabilities such as a 1 byte short quality of service (QoS) field.

In some aspects, the MAC header 400 may not include a fragment number subfield. In such aspects, an STA and AP (e.g., STA 106 and AP 104) communicating using such a MAC header 400, may limit the maximum allowed size of a MAC service data unit (MSDU) sent with the MAC header 400. The STA 106 and/or AP 104 may determine or agree on a maximum allowed size of the MSDU during association, re-association, probe request/probe response, or some other suitable time period using appropriate messaging.

In some aspects, the sc field 430 may include a short sequence number (SN) subfield of 8 bits or less that includes the value of a short SN. In some aspects, the short sequence number subfield corresponds to the 8 least significant bits (lsb) of a 12-bit sequence number subfield as defined for an uncompressed MAC header such as the MAC header 300. In some aspects, if the value of the short sequence number is 0, the transmitter may send a frame with an uncompressed MAC header with the full sequence number instead of the short MAC header with a short sequence number of value 0. In some aspects, the short sequence number subfield is a subfield of 11-bits or less of the sc field 430. In some aspects, additionally or alternatively, the sc field 430 may selectively include an extended field. In some aspects, presence or absence of such an extended field in the sc field 430 of the MAC header 400 may be indicated by the value of a one or more bits in the fc field 405. The extended field may include a fragmentation number subfield (e.g., 4 bits or less), a retry subfield (e.g., 1 bit), a more frag subfield (e.g., 1 bit), and/or a traffic class indication subfield (e.g., 3 bits).

The capabilities that may be provided by using the certain bits of the MAC header 400 include, for example, QoS and high throughput (HT) control. For example, QoS control capabilities that may be provided and an example of the number of bits used include at least one of the following: TID (3 bits), end of service period (EOSP) (1 bit), aggregated MAC service data unit (A-MSDU) (1 bit), ACK policy, and queue size. Further, HT control capabilities that may be provided and an example of the number of bits used include at least one of the following: fast link adaptation (16 bits), calibration position/sequence (4 bits), channel state information (CSI)/steering (2 bits), null data packet (NDP) announcement (1 bit), and access control (AC) constraint/reverse direction grant (RDG) (3 bits).

Figure 4B:
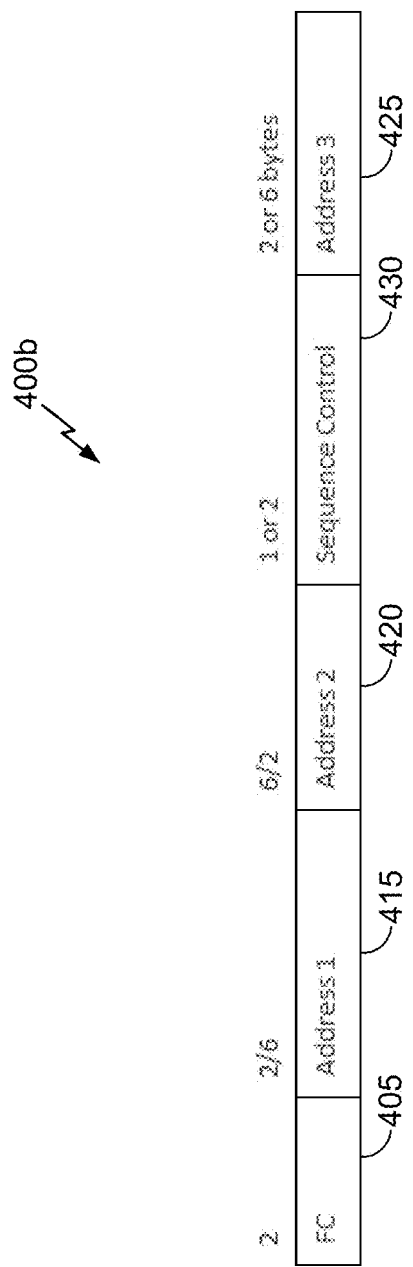
FIG. 4B illustrates an example of another compressed MAC header.

FIG. 4B illustrates an example of another compressed MAC header 400b. The MAC header 400b includes the same fields as the MAC header 400, but unlike the MAC header 400, also includes an a3 field 425. In particular, the MAC header 400b is an example of a compressed MAC header when an a3 address is present (e.g., the a3 present bit in the fc field 405 is set to 1). As shown, the compressed MAC header 400b includes 5 different fields: a frame control (fc) field 405, a first address (a1) field 415, a second address (a2) field 420, a sequence control (sc) field 430, and an a3 field 425. FIG. 4B further indicates the size in octets of each of the fields 405-430. As shown, the a3 field 425 comes after the sc field 430. In another aspect, the a3 field 425 may be placed elsewhere in the MAC header 400b, such as before the sc field 430 and after the a2 field 420.

FIG. 5 illustrates examples of the type of data in the fields of the compressed MAC header 400 for a data packet, and the data for a corresponding acknowledgement according to one aspect of the MAC header 400. As shown, in the figure, the columns labeled "Data" correspond to the information sent as part of a data packet (as shown, the information for the a1 field 415 and the a2 field 420 and optionally an a3 field). The column labeled "ACK" corresponds to the information sent in a corresponding ACK. The column labeled "Direction" indicates the direction or link type over which the data packet is sent. As shown, if the MAC header 400 is part of a data packet transmitted over a downlink from an AP to an STA, the a1 field 415 includes a receiver AID (R-AID) and the a2 field 420 includes a BSSID. The R-AID is the AID of the STA receiving the packet. The R-AID may comprise 13-bits allowing for 8192 STAs to be addressed uniquely in a given BSS by their R-AIDs. The 13-bit R-AID may allow for approximately 6000 STAs and 2192 other values, such as an indication that the packet is a multicast or broadcast packet, the type of the multicast or broadcast packet (i.e. a beacon), possibly in combination with a beacon change sequence number that indicates the version of the beacon that is comprised within the packet. The BSSID is the MAC address of the AP and may comprise 48 bits. The STA receiving the packet with the MAC header 400 may uniquely determine whether or not it is the intended recipient of the packet based on the a1 field 415 and the a2 field 420. In particular, the STA can check to see if the R-AID matches the R-AID of the STA. If the R-AID matches, the STA may be the intended recipient of the packet. This alone may not uniquely determine whether the STA is the recipient, as STAs in different BSSs may have the same R-AID.

Accordingly, the STA may further check to see if a2 field 420 includes the BSSID of the AP (i.e., BSS) that the STA is associated with. If the BSSID matches the association of the STA and the R-AID matches, the STA uniquely determines it is the intended recipient of the packet and may further process the packet. Otherwise, the STA may ignore the packet.

If the STA determines it is the intended recipient, it may send an acknowledgment message (ACK) to the AP to indicate successful receipt of the packet. In one aspect, the STA may include all or a portion of the a2 field 420 such as a partial BSSID (pBSSID) comprising less than all the bits of the BSSID (e.g., 13 bits) in a MAC or physical layer (PHY) header of the ACK. Accordingly, in order to produce the ACK, the STA need only directly copy bits from the received MAC header 400, which reduces processing. The AP receiving the ACK may determine the ACK is from the STA if it is received soon after a certain time period (e.g., a short inter frame space (SIFS)) from transmission of the initial packet as it is unlikely the AP will received two ACKs with the same information in the time period. In another aspect, the STA may transmit all or a portion of a cyclic redundancy check (CRC) from the packet or a hash of all or a portion of the packet in the MAC or PHY header of the ACK. The AP may determine the STA sent the ACK by checking for such information. Since such information is random for each packet, it is highly unlikely two ACKs with the same information will be received after the time period by the AP.

Further, the packet transmitted by the AP to the STA may optionally include a source address (SA) used for indicating a routing device to be used to route the packet. The MAC header 400 may further include a bit or field indicating whether the SA is present in the MAC header 400. In one aspect, the order bit of the frame control field of the MAC header 400 may be used to indicate presence or absence of the SA. In another aspect, two different subtypes may be defined for the compressed MAC header 400, one subtype including an a3 field such as the SA and one subtype not including the a3 field such as the SA. The subtype may be indicated via the value of a subtype field of the frame control field of the MAC header 400. In some aspects, the AP and STA may transmit information regarding the SA as part of another packet and omit the SA from the data packet. The STA may store the SA information and use it for all packets sent from the AP, or for certain packets that have a particular identifier associated with them (e.g., a flow ID) as discussed later.

As shown, if the MAC header 400 is part of a data packet transmitted over an uplink from an STA to an AP, the a1 field 415 includes a BSSID of the AP and the a2 field 420 includes an AID of the STA, which may be referred to as a transmitter AID (T-AID). The AP may similarly determine whether it is the intended recipient and the transmitter of the data packet based on the BSSID and the T-AID as discussed above. In particular, the AP can check to see if the BSSID matches the BSSID of the AP. If the BSSID matches, the AP is the intended recipient of the packet. Further, the AP can determine the transmitter of the packet based on the T-AID as only one STA in the BSS of the AP has the T-AID.

If the AP determines it is the intended recipient, it may send an acknowledgment message (ACK) to the STA to indicate successful receipt of the packet. In one aspect, the AP may include all or a portion of the a2 field 420 such as the T-AID in a MAC or physical layer (PHY) header of the ACK. Accordingly, in order to produce the ACK, the AP need only directly copy bits from the received MAC header 400, which reduces processing. The STA receiving the ACK may determine the ACK is from the AP if it is received soon after a certain time period (e.g., a short inter frame space (SIFS)) from transmission of the initial packet as it is unlikely the STA will received two ACKs with the same information in the time period. In another aspect, the AP may transmit all or a portion of a cyclic redundancy check (CRC) from the packet or a hash of all or a portion of the packet in the MAC or PHY header of the ACK. The STA may determine the AP sent the ACK by checking for such information. Since such information is random for each packet, it is highly unlikely two ACKs with the same information will be received after the time period by the STA.

In some aspects, the address field of the ACK may include one or more global addresses (e.g., a MAC address, BSSID) that uniquely identifies a transmitter and/or receiver of the ACK globally (e.g., in most any network). In some aspects, the address field may include one or more local addresses (e.g., an association identifier (AID)) that uniquely identifies a transmitter and/or receiver of the ACK locally (e.g., in a local network such as in a particular BSS). In some aspects, the address field may include a partial or non-unique identifier (e.g., a portion of a MAC address or AID) that identifies a transmitter and/or receiver of the ACK. For example, the address field may be one of the AID, MAC address, or a portion of the AID or MAC address of the transmitter and/or receiver of the ACK that is copied from the frame being acknowledged by the ACK.

In some aspects, the identifier field of the ACK may identify the frame being acknowledged. For example, in one aspect, the identifier field may be a hash of the content of the frame. In another aspect, the identifier field may include all of or a portion of the CRC (e.g., the FCS field) of the frame. In another aspect, the identifier field may be based on all of or a portion of the CRC (e.g., the FCS field) of the frame and all or a portion of a local address (e.g., AID of an STA). In another aspect, the identifier field may be a sequence number of the frame. In another aspect, the identifier field may include one or more of the following in any combination: one or more global addresses of the transmitter/receiver of the ACK, one or more local addresses of the transmitter/receiver of the ACK, one or more portions of global addresses of the transmitter/receiver of the ACK, or one or more portions of local addresses of the transmitter/receiver of the ACK. For example, the identifier field may include a hash of a global address (e.g., BSSID, MAC address of an AP) and a local address (e.g., AID of an STA) as shown in Equation 1.

$$(dec(AID[0:8])+dec(BSSID[44:47] \text{ XOR } BSSID[40:43])2^5) \bmod 2^9 \quad (1)$$

where dec( ) is a function that converts a hexadecimal number to a decimal number. Other hash functions based on the same inputs may be implemented without departing from the scope of the disclosure.

In some aspects the frame for which the ACK is sent in response may include a token number set by the transmitter of the frame. The transmitter of the frame may generate the token number based on an algorithm. In some aspects, the token number generated by the transmitter may have a different value for each frame sent by the transmitter. In such aspects, the receiver of the frame may use the token number in the identifier field of the ACK to identify the frame being acknowledged such as by setting the identifier as the token number or computing the identifier based at least in part on the token number. In some aspects, the identifier field may be computed as a combination of the token number with at least one of the following: one or more global addresses of the transmitter/receiver of the ACK, one or more local addresses of the transmitter/receiver of the ACK, one or more portions of global addresses of the transmitter/receiver of the ACK, one or more portions of local addresses of the transmitter/receiver of the ACK, or all or a portion of a CRC of the frame. In some other aspects the token number may be included in another field of the ACK and/or frame being acknowledged such as a SIG field and/or a control information (Control Info) field. In some aspects the token may be derived from a scrambling seed in a SERVICE field, which may come after a PHY preamble, of the frame being acknowledged.

By the techniques described above, the response frame (e.g., ACK, CTS, BA) can echo a value, such as a FCS or random number (e.g., packet ID), in the initiating frame (e.g., data, RTS, BAR). The echo value may be based, at least in part, on the scrambler seed. The echoed value may be transmitted in the scrambler seed field of the response frame. The echoed value may be transmitted in the SIG field of the response frame. The echoed value may be transmitted in the MPDU included in the response frame.

In some implementations, it may be desirable for the frame check sum (FCS) of the initiating frame (e.g., data, RTS, BAR) to be based on or include a random number (e.g., packet ID). This value may be used as the echo value. In such implementations, the echo value may be included in the scrambled seed of the initiating frame. Accordingly, the FCS may be echoed in full or in part in the response frame (e.g., ACK, CTS, BA).

Through the use of the echo value, by including an echo value, the response frame may not include the station identifier of the initiating frame. One or more of the addressing schemes on an initiating frame (e.g., Data, RTS, BAR, etc.) may be used with the response frame (e.g., ACK, CTS, BA, etc.) that echoes the FCS or a packet ID of the initiating frame, but not a station identifier. This may improve communications as described above.

Further, the packet transmitted by the STA to the AP may optionally include a destination address (DA) used for indicating a routing device to be used to route the packet. The MAC header 400 may further include a bit or field indicating whether the DA is present in the MAC header 400. In one aspect, the order bit of the frame control field of the MAC header 400 may be used to indicate presence or absence of the DA. In another aspect, two different subtypes may be defined for the compressed MAC header 400, one subtype including an a3 field such as the DA and one subtype not including the a3 field such as the DA. The subtype may be indicated via the value of a subtype field of the frame control field of the MAC header 400. In some aspects the values of the subtype indicating presence or omission of the DA are the same values as used to indicate presence or omission of the SA for DL packets. In some aspects, the AP and STA may transmit information regarding the DA as part of another packet and omit the DA from the data packet. The AP may store the DA information and use it for all packets sent from the STA, or for certain packets that have a particular identifier associated with them (e.g., a flow ID) as discussed later.

As shown, if the MAC header 400 is part of a data packet transmitted over a direct link from a transmitting STA to a receiving STA, the a1 field 415 includes a full receiver address (RA) of the receiving STA and the a2 field 420 includes an AID of the transmitting STA, which may be referred to as the transmitter AID (T-AID). The receiving STA may similarly determine whether it is the intended recipient and the transmitter of the data packet based on the RA and the T-AID as discussed above. In particular, the receiving STA can check to see if the RA matches the RA of the receiving STA. If the RA matches, the receiving STA is the intended recipient of the packet. Further, the receiving STA can determine the transmitter of the packet based on the T-AID as only one transmitting STA in the BSS of the receiving STA has the T-AID.

If the receiving STA determines it is the intended recipient, it may send an acknowledgment message (ACK) to the transmitting STA to indicate successful receipt of the packet. In one aspect, the receiving STA may include all or a portion of the a2 field 420 such as the T-AID in a MAC or physical layer (PHY) header of the ACK. Accordingly, in order to produce the ACK, the receiving STA need only directly copy bits from the received MAC header 400, which reduces processing. The transmitting STA receiving the ACK may determine the ACK is from the receiving STA if it is received soon after a certain time period (e.g., a short inter frame space (SIFS)) from transmission of the initial packet as it is unlikely the transmitting STA will receive two ACKs with the same information in the time period. In another aspect, the receiving STA may transmit all or a portion of a cyclic redundancy check (CRC) from the packet or a hash of all or a portion of the packet in the MAC or PHY header of the ACK. The transmitting STA may determine the receiving STA sent the ACK by checking for such information. Since such information is random for each packet, it is highly unlikely two ACKs with the same information will be received after the time period by the transmitting STA.

Whether the packet is sent as part of a downlink, uplink, or direct link may be indicated by certain bits in the MAC header 400. For example, the to-distribution system (to-ds) and from-ds fields of the fc field 405 may be used to indicate the link type used for sending the packet (e.g., 01 for the downlink, 10 for the uplink, and 00 for the direct link) as shown in the column labeled To-DS/From-DS. Accordingly, the recipient of a packet may determine the length (e.g., 2 octets or 6 octets) of the a1 field 415 and a2 field 420 based on the type of address that is expected in each field and thus determine the address contained in each field.

In another aspect, instead of indicating whether the packet is a part of a downlink, uplink, or direct link, 1 bit (e.g., a 1 bit substitute for the to-ds/from-ds field) may be used in the MAC header 400 to indicate which type of address is in each of the a1 field 415 and a2 field 420. For example, one value of the bit may indicate the a1 field 415 is the address of the receiver of the data packet and the a2 field 420 is the address of the transmitter of the data packet. The other value of the bit may indicate the a1 field 415 is the address of the transmitter of the data packet and the a2 field 420 is the address of the receiver of the data packet.

Further examples of data packets are shown and described below in FIGS. 20 and 21.

FIG. 6 illustrates examples of the type of data in the fields of the compressed MAC header 400 for a data packet, and the data for a corresponding acknowledgement according to another aspect of the MAC header 400. As shown, the MAC header 400 includes the same data as described with respect to FIG. 5 and thus the information can be used in the same manner, except the ACK sent in response to a received data packet is a block ACK (BA) instead of an ACK for a single device. A block ACK allows a device to receive multiple data packets associated and respond as to whether the multiple packets were received using a single block ACK. For example, the block ACK may include a bitmap with multiple bits, the value of each bit indicating whether or not particular data packets in a sequence of data packets of a flow were received. Accordingly, the BA includes information from both the a1 field 415 and the a2 field 420, instead of just the a2 field 420 as shown. As shown, if the MAC header 400 is part of a data packet transmitted over a downlink, BA includes the BSSID followed by the AID. As shown, if the MAC header 400 is part of a data packet transmitted over an uplink, BA includes the AID followed by the BSSID. As shown, if the MAC header 400 is part of a data packet transmitted over a direct link, BA includes the T-AID followed by the RA.

FIG. 7 illustrates examples of the type of data in the fields of the compressed MAC header 400 for a data packet, and the data for a corresponding acknowledgement according to another aspect of the MAC header 400. As shown, the MAC header 400 includes similar data as described with respect to FIG. 6 and thus the information can be used in a similar manner. However, as shown, for each of the downlink, uplink, and direct link packets, the a1 field 415 includes a local identifier of the recipient of the packet, while the a2 field 420 includes a global identifier of the transmitter of the packet. Accordingly, use of bits, such as the to-ds and from-ds fields, to indicate what type of link the packet is sent over may not be needed as the a1 field 415 is always 2 octets, while the a2 field 420 is always 6 octets, instead of being based on the type of link the packet is sent over and thus such information does not need to be determined based on link type. For example, if the packet is sent over the downlink, the recipient STA may transmit a block ACK with the AID of the STA followed by the BSSID of the AP instead of the BSSID of the AP followed by the AID of the STA as in the example described with respect to FIG. 6.

If the packet is sent over the uplink, the a1 field 415 may include the AID of the AP, which is set to 0, and the a2 field 420 may include the MAC address of the STA (STA_MAC). Further, the AP receiving the packet may send an ACK including the AID of the AP followed by the STA_MAC.

If the packet is sent over a direct link, the a1 field 415 may include the R-AID of the receiver STA, and the a2 field 420 may include the transmitter address (TA) of the transmitting STA, which may be the MAC address of the transmitting STA. Further, the receiver STA may send an ACK including the R-AID of the receiver STA followed by the TA of the transmitting STA.

In the example of FIG. 7, for packets over the uplink, the AP may need to store a lookup table that associates STA MACs of STAs with AIDs in order to send and receive data, since information is received using MAC address, but transmitted using AIDs, unlike in the example of FIGS. 5 and 6, where the AP only sends and receives information based on the AIDs of the STAs. Similarly, for packets over the direct link, STAs may need to store a similar lookup table for similar reasons.

FIG. 8 illustrates examples of the type of data in the fields of the compressed MAC header 400 for a data packet, and the data for a corresponding acknowledgement according to another aspect of the MAC header 400. As shown, for each of the downlink, uplink, and direct link packets, the AID of the receiving device is followed by the AID of the transmitting device, which is followed by the BSSID of the AP the devices are associated with. Further, for block ACKs, the recipient of a packet transmits the AID of the transmitting device, followed by the AID of the receiving device, followed by the BSSID of the AP the devices are associated with. In this example, as discussed above with FIG. 7, use of bits, such as the to-ds and from-ds fields, to indicate what type of link the packet is sent over may not be needed. Further, lookup tables do not need to be stored as all the relevant information is included in the packets.

FIG. 9 illustrates examples of the type of data in the fields of the compressed MAC header 400 for a data packet, and the data for a corresponding acknowledgement according to another aspect of the MAC header 400. As shown, the MAC header 400 includes similar data as described with respect to FIG. 8. However, the ACK shown is an ACK for a single device, not a block ACK. As shown, the ACK for each packet is the AID of the transmitting device. However, as shown, for downlink packet ACKs, the AID is always 0, which means if multiple ACKs with AID 0 are received, the AP may not be able to determine if the ACK is intended for the AP. Accordingly, in one aspect, for the downlink packet ACKs, a pBSSID may be used instead of the AID. Using a pBSSID, however, means that generating the ACK may be based on the link type, which means bits, such as the to-ds and from-ds fields, may be needed to indicate the link type.

FIG. 10 illustrates examples of the type of data in the fields of the compressed MAC header 400 for a data packet, and the data for a corresponding acknowledgement according to another aspect of the MAC header 400. As shown, the MAC header 400 includes the same data as described with respect to FIG. 5. However, the ordering of some of the fields is changed. In particular, for the uplink, the a1 field 415 includes the AID of the transmitting STA and the a2 field 420 includes the BSSID of the receiving AP. Further, for the direct link, the a1 field 415 includes the T-AID of the transmitting STA and the a2 field 420 includes the RA of the receiving STA. Accordingly, the a1 field 415 is always 2 octets and the a2 field 420 is always 6 octets. Bits to indicate the link type may still be needed to determine for which device, transmitting or receiving, each field includes an address. A from-ds or from-ap bit located in the frame control may be used to indicate the link type.

FIG. 11 illustrates examples of the type of data in the fields of the compressed MAC header 400 for a data packet, and the data for a corresponding acknowledgement according to another aspect of the MAC header 400. As shown, the MAC header 400 includes the same data as described with respect to FIG. 10 and thus the information can be used in the same manner, except the ACK sent in response to a received data packet is a block ACK (BA) instead of an ACK for a single device. Accordingly, the BA includes information from both the a1 field 415 and the a2 field 420, instead of just the a2 field 420 as shown. As shown, if the MAC header 400 is part of a data packet transmitted over a downlink, BA includes the BSSID followed by the AID. As shown, if the MAC header 400 is part of a data packet transmitted over an uplink, BA includes the AID followed by the BSSID. As shown, if the MAC header 400 is part of a data packet transmitted over a direct link, BA includes the T-AID followed by the RA. Accordingly, the a1 field 415 is always 2 octets and the a2 field 420 is always 6 octets. Bits to indicate the link type may still be needed to determine for which device, transmitting or receiving, each field includes an address for. A from-ds or from-ap bit located in the frame control may be used to indicate the link type.

FIG. 12 illustrates examples of the type of data in the fields of the compressed MAC header 400 for a data packet, and the data for a corresponding acknowledgement according to another aspect of the MAC header 400. As shown, MAC header 400 includes the same data as described with respect to FIG. 10 and thus the information can be used in the same manner. However, the values of the a1 field 415 and a2 field 420 are reversed for the transmitted packet as compared to the example described with respect to FIG. 10.

FIG. 13 illustrates examples of the data in the fields of the compressed MAC header 400 used in request-to-send (RTS)/clear-to-send (CTS) addressing. As shown, in a RTS message, the a1 field 415 includes the RA of the receiving device and the a2 field 420 includes the T-AID of the transmitting device. Further, the CTS message includes the T-AID of the transmitting device.

In some aspects, a QoS frames without data may be compatible with the short MAC header 400. For example, the MAC header 400 may be compatible for use with a QoS null frame, a QoS CF-poll frame, and/or a QoS CF-ACK+CF-poll frame. A type field and/or subtype field may be included in the fc field 405 of the MAC header 400 to indicate the type of frame (e.g., QoS null frame, a QoS CF-poll frame, or a QoS CF-ACK+CF-poll frame).

FIG. 14 illustrates examples of the type of data in the fields of the compressed MAC header 400 for a management frame, and the data for a corresponding acknowledgement according to another aspect of the MAC header 400. As shown, a value of 01 for the to-ds/from-ds fields indicates that the management frame is sent over a downlink. The a1 field 415 includes the AID of the receiving STA, and the a2 field 420 includes the BSSID of the transmitting AP. The ACK transmitted in response to receipt of the management frame from the receiving STA includes a pBSSID of the AP copied from the a2 field 420.

As shown, a value of 10 for the to-ds/from-ds fields indicates that the management frame is sent over an uplink. The a1 field 415 includes the BSSID of the receiving AP, and the a2 field 420 includes the AID of the transmitting STA. The ACK transmitted in response to receipt of the management frame from the receiving AP includes the AID of the STA copied from the a2 field 420.

In some aspects, the acknowledgement message (ACK) can carry a short address or a full MAC address. When carrying a short address, the ACK can carry either pBSSID (response to downlink) or AID (response to uplink). Examples of such a short address are shown in FIG. 5, FIG. 10 and FIG. 12 described above.

FIG. 15 illustrates examples of the type of data in the fields of the compressed MAC header 400 for a data packet, and the data for a corresponding acknowledgement according to one aspect of the MAC header 400, with the ACK carrying a full MAC address.

As shown, if the MAC header is part of a data packet transmitted over a downlink from an AP to an STA, the a1 field 415 includes a station AID (STA-AID) and the a2 field 420 includes a BSSID. Further, the station may send an ACK to the AP including the BSSID. As shown, if the MAC header is part of a data packet transmitted over an uplink from an STA to an AP, the a1 field 415 includes a BSSID of the AP and the a2 field 420 includes the MAC address of the STA (STA-MAC). Further, the AP receiving the packet may send an ACK including the STA-MAC. As shown, if the MAC header 400 is part of a data packet transmitted over a direct link from a transmitting STA to a receiving STA, the a1 field 415 includes the MAC address of the receiving STA (R-STA-MAC) and the a2 field 420 includes the MAC address of the transmitting STA (T-STA-MAC). Further, the receiving STA may send an ACK including the T-STA-MAC.

In some aspects, the transmitter address in the a2 field 420 of the compressed MAC header 400 for a data packet can always be the full MAC address of the transmitter. The receiver address in the a1 filed 415 can be the AID of the receiver. In this case, the AID of the AP can be assigned to '0'.

FIG. 16 illustrates further examples of the type of data in the fields of the compressed MAC header 400 for a data packet. As shown, in the figure, the columns labeled "Data" correspond to the information sent as part of a data packet (as shown, the information for the address one (a1) field 415 and the address two (a2) field 420 and optionally an address three (a3) field). The column labeled "Direction" indicates the direction or link type over which the data packet is sent. The example shown in FIG. 16 illustrates the use of RA/AID addressing in data packets.

Row 1602 illustrates a data packet sent on a downlink communication connection. The receiver address is specified in the a1 field 415. The transmitter address in a2 field 420 is set to zero. The optional a3 field includes a value indicating the address of the source device for the transmission. For example, the a3 may include the address of a STA generating the message.

Row 1604 illustrates a data packet sent on an uplink communication connection. The a1 field 415 includes a value representing the BSSID of the receiver. The a2 field 420 includes the AID of the transmitting device. The optional a3 field may include an address for the destination of the data packet (e.g., another STA).

Row 1606 represents a direct communication connection. As described above a direct connection is a communication link between two STAs. The a1 field 415 includes the receiver address. The a2 field 420 includes the AID of the transmitting device.

FIG. 17 illustrates further examples of the type of data in the fields of the compressed MAC header 400 for a data packet. As shown, in the figure, the columns labeled "Data" correspond to the information sent as part of a data packet (as shown, the information for the address one (a1) field 415 and the address two (a2) field 420 and optionally an address three (a3) field). The column labeled "Direction" indicates the direction or link type over which the data packet is sent. The column labeled "From-AP" indicates a bit value identifying whether the data is sent from an AP. In this example, no source AID may be included for frames transmitted from the AP. However in this example there is a From-AP field that replaces the to-DS/from-DS fields shown in previous examples.

Row 1702 represents a downlink communication connection. Since this message will be sent to the receiving device, the from-AP bit is set to one. The a1 field 415 includes a value representing the address of the receiver device.

Row 1704 represents an uplink communication connection. As this message is not transmitted from an AP, the from-AP bit is set to zero. The a1 field 415 may include the BSSID of the receiver device. The a2 field 420 may include the AID of the transmitting device. The a3 field may optionally include a destination address value.

Row 1706 represents a direct communication link. In this example, the from-AP bit is set to zero. The A1 field 415 includes the receiver address value. The a2 field includes the AID of the transmitting device. As shown, the address field three is empty.

It should be noted that for each aspect described with respect to FIG. 5-17, the use of AIDs and BSSIDs are merely illustrative. Instead of AIDs, any type of local identifier may be used in the aspects described. Further, instead of BSSIDs, any type of global identifier may be used in the aspects described. Further, the ordering of the a1 and a2 fields described may be changed.

In some aspects, management frames may be compressed in a similar fashion as other data packets described above. In particular, instead of a TID, management frames have an optional adjacent channel interference (ACI) field. As stated above, all the bits in the 2 octet length a1 or a2 field may not be used, as only 13-bits may be used. The other three bits may therefore be utilized for other purposes. For example, the ACI may be included in the 2 octet length a1 or a2 field. Further, the to-ds and from-ds fields may not be available in management frames to indicate a link type the frame is sent over, and therefore cannot be used to indicate a format for the MAC header as discussed above. Accordingly, uplink and downlink packets may have the same format (e.g., addressing format) meaning each field includes the same format of information (e.g., local identifier, global identifier, or some other suitable data). For example, the a1 field of a management frame may include a local identifier (e.g., AID), the a2 field a global identifier (e.g., MAC address), and further a BSSID may be included. Further, management frames travel only between an AP and an STA so SA and DA may not be required.

In some aspects, other control and/or management frames may be compatible with a short MAC header such as the short MAC header 400. For example, the MAC header 400 may be compatible for use with any of the following control frames: a request to send (RTS) frame, a clear to send (CTS) frame, an ACK frame, a block ACK request (BAR) frame, a multi TID-BAR frame, a block ACK (BA) frame, a power save poll (PS-poll) frame, a contention free end (CF end) frame, a beamforming report poll, a null data packet announcement (NDPA), a beacon frame, etc. In some aspects, these various types of control frames have the functionality as any of the control frames of the same name defined in the IEEE 802.11 specifications. As discussed above, a type field and/or subtype field may be included in the fc field 405 of the MAC header 400 to indicate the type of frame.

In some aspects, the control frames may utilize the MAC header 400, including the fields of the MAC header 400 as shown in FIG. 4 or the MAC header 400a, including the fields of the MAC header 400a as shown in FIG. 4A. In some such aspects, the sequence control field 430 may be omitted. If the frame is a CTS frame, in some aspects, the a1 field 415 and/or the a2 field 420 may be alternatively or additionally omitted. If the frame is a PS-Poll frame, in some aspects, alternatively or additionally a PS-poll control field (e.g., as defined in the IEEE 802.11 specifications) may be added. If the frame is a BAR frame or a BA frame, in some aspects, alternatively or additionally a BAR information field and/or BAR control field (e.g., as defined in the IEEE 802.11 specifications) may be added. If the frame is a NDPA, in some aspects, alternatively or additionally one or more STA info fields (e.g., as defined in the IEEE 802.11 specifications) may be added.

In some aspects, only the to-ds/from-ds value 00 and 01 may be used normally for management frames. Accordingly, the values 01 and 11 may still be used for signaling a difference between uplink and downlink addressing.

FIGS. 18-23 illustrate other aspects of compressed MAC headers that include certain fields and do not include other fields as discussed above, and that can be used for communication between the wireless device 202t and the wireless device 202r. The fields may be used in the manners discussed above. It should be noted that other MAC headers, not illustrated herein, that may have different combinations of fields based on the above discussion are also within the scope of the disclosure.

FIG. 18 illustrates a compressed MAC header similar to FIG. 3A with the dur field, a1 field, a2 field, a3 field, sc field, qc field, htc field, llc/snap field, and fcs field removed while utilizing a new frame subtype value and using PV0 for the protocol version. Further, a pra field and pta field are added and may in part be used to determine addressing information as discussed above. Further, an ethertype field is added instead of the llc/snap field as discussed above. In addition an access category index (aci) field and a header check sequence field are added, wherein the aci field indicates a priority of the frame and the hcs field includes a short cyclic redundancy check that validates the correctness of the MAC header (i.e. without including the payload). FIG. 19 illustrates a MAC header similar to FIG. 18. However, in the MAC header of FIG. 19, the fc field is reduced in size and the protocol version is changed to PV1. As shown, in the fc field; the subtype field, to-ds field, from-ds field, more frag field, pf field, and order field are removed. Further, an a3 present field is added to indicate whether an a3 field is present or not in the MAC header of FIG. 19 (in the illustrated example it is not present). In another embodiment, the short MAC header with a3 present may be indicated using a different value of the type field in the frame control. Alternatively, the same formatting of the MAC header can be used while the protocol version is set to 0 (PV0), but this may cause erroneous reactions at legacy nodes.

FIG. 20 illustrates a MAC header similar to FIG. 19. However, in the MAC header of FIG. 20, the pra field is removed.

FIG. 21 illustrates a MAC header similar to FIG. 19. In the illustrated example of FIG. 21, the a3 field is present.

FIG. 22 illustrates a MAC header similar to FIG. 19. However, in the illustrated example, the fc field further includes a compressed a3 present (compr a3) field that indicates whether or not the a3 address of the packet corresponds to an a3 address stored at the receiving device as discussed above.

FIG. 23 illustrates a MAC header similar to FIG. 22. However, in the MAC header of FIG. 22, the pra field is removed.

Figure 24A:
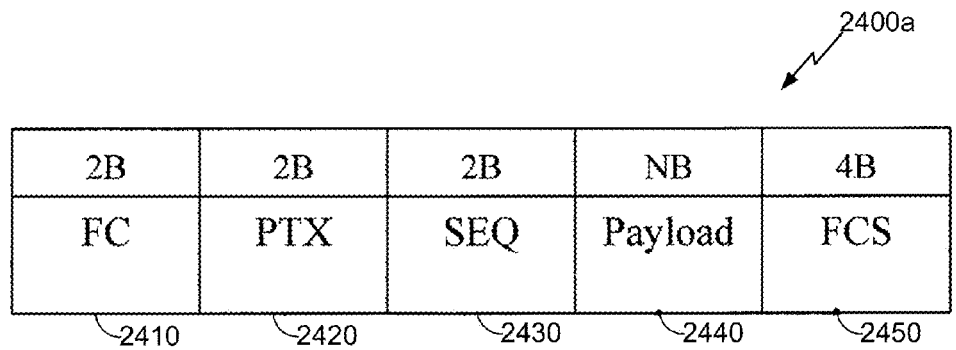
FIGS. 24A-C illustrate examples of types of compressed MAC headers with an unencrypted payload.
Figure 24B:
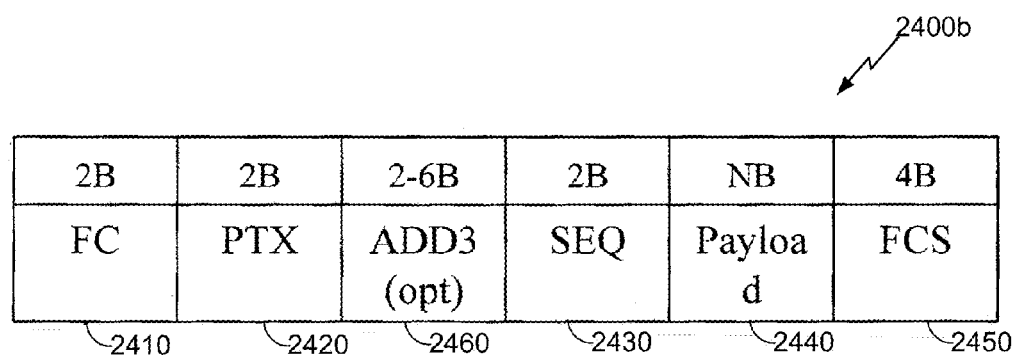
Figure 24C:
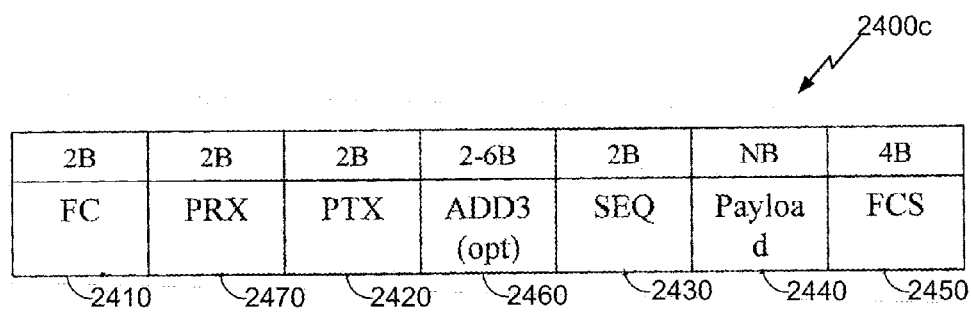

FIGS. 24A-C illustrate examples of types of compressed MAC headers with an unencrypted payload. As shown in FIG. 24A, a MAC header 2400a can include a frame control (FC) field 2410, a partial transmit (PTA or PTX) field 2420, a frame sequence number (SEQ) field 2430, and a frame control sequence (FCS) field 2450. In the illustrated embodiment, the FC field 2410 is two bytes long, the PTX field 2420 is 2 bytes long, the SEQ field 2430 is two bytes long, and the FCS field 2450 is four bytes long. Although a payload 2440 is depicted for reference, it may not be part of the MAC header 2400a. At least some of the fields described herein with respect to FIG. 24a can be similar to corresponding fields described above with respect to FIG. 3A. In various embodiments, the MAC header 2400a can include additional fields not shown and can omit one or more fields shown. A person having ordinary skill in the art will appreciate that the fields of the MAC header 2400a can be any size.

With continuing reference to FIG. 24A, the MAC header 2400a can omit a receiver address field, such as the a1 field 325a described above with respect to FIG. 3A. Accordingly, the wireless device 202t can calculate the FCS FIELD 2450 as if the receiver address field were present in the MAC header 2400a, even though the MAC header 2400a may not contain the receiver address field. When a receiver, such as the wireless device 202r, receives the MAC header 2400a, it may implicitly know its own address. For example, in an embodiment, the wireless device 202r may store its own network address in the memory 206. Accordingly, the receiver can calculate an expected FCS based on one or more fields in the MAC header 2400a combined with an implicitly known receiver address. The receiver can then compare the expected FCS to the received FCS field 2450 from the MAC header 2400a. If the received FCS field 2450 matches the expected FCS calculated using an implicit receiver address omitted from the MAC header 2400a, the receiver can determine that a frame associated with the MAC header 2400a was addressed to the receiver and that it was correctly received.

As illustrated in FIG. 24A, the MAC header 2400a can omit a source or transmit address field (not shown), such as the a2 field 320a described above with respect to FIG. 3A. For example, where a receiver can only receive data from an access point, the transmit address field can be omitted. In some embodiments, however, a partial transmit address (PTA or PTX) field 2420 is included in the MAC header 2400a. The PTX field 2420 may be included in network environments where a wireless device may be uploading data, or in a Tunneled Direct Link Setup (TDLS) environment. In an embodiment, the PTX field 2420 can be based on the transmitter's MAC address. For example, the PTX field 2420 can include a preset number of the least significant bits (LSBs) of the transmitter's MAC address. As discussed above, the PTX field 2420 can allow a wireless receiver to narrow down the number of keys it searches upon receipt of a frame containing the MAC header 2400a. In other embodiments, the MAC header 2400a can include the transmit address field.

As shown in FIG. 24B, a MAC header 2400b can include the frame control (FC) field 2410, the partial transmit address (PTA or PTX) field 2420, the frame sequence number (SEQ) field 2430, and the frame control sequence (FCS) field 2450. Although the payload 2440 is depicted for reference, it may not be part of the MAC header 2400b. In various embodiments, the MAC header 2400b can include additional fields not shown and can omit one or more fields shown. For example, as illustrated in FIG. 24B, the MAC header 2400b includes a destination address (ADD3) field 2460. In an embodiment, the ADD3 field 2460 can be the a3 field 325a discussed above with respect to FIG. 3A. The ADD3 field 2460 can be used in network environments where frames can be relayed to their ultimate destination.

As shown in FIG. 24C, a MAC header 2400c can include the frame control (FC) field 2410, a partial receiver address (PRA or PRX) field 2470, the partial transmit address (PTA or PTX) field 2420, the frame sequence number (SEQ) field 2430, and the frame control sequence (FCS) field 2450. Although the payload 2440 is depicted for reference, it may not be part of the MAC header 2400c. In various embodiments, the MAC header 2400c can include additional fields not shown and can omit one or more fields shown. For example, as illustrated in FIG. 24C, the MAC header 2400c includes the destination address (ADD3) field 2460. The MAC header 2400c may include the PRX field 2470 in order to provide the receiver with some indication of whether it checks the FCS field 2450. For example, if the receiver's address does not match the PRX field 2470, it can decide not to calculate an expected FCS because the received FCS field 2450 may be unlikely to match. If the receiver's address does match the PRX field 2470, however, it can decide to calculate an expected FCS in order to determine whether the frame is addressed to the receiver. In other words, the PRX field 2470 can provide the receiver with a way to avoid further processing when a received frame is not addressed to the receiver. Less processing can result in lower power consumption.

In an embodiment, the PRX field 2470 can be based on the receiver's MAC address. In another embodiment, the PRX field 2470 can be based on both the receiver's MAC address and a transmit MAC address. For example, the PRX field 2470 can be a hash of the transmitter's MAC address and an ID of the receiver. In various embodiments, other preliminary indications can be used to allow a receiver to discard a received frame without calculating an expected frame check.

In the various embodiments described herein, where portions of a traditional MAC header are omitted, the wireless device 202t can omit the FCS field 2450 (FIGS. 24A-C) altogether. For example, in frames containing encrypted payloads, a MAC header can reuse and build on existing fields related to the encryption. Header reuse can result in a shorter frame because an encrypted payload may already include its own encryption-related headers. Using pre-existing encryption-related header fields to fill the role of traditional MAC header fields can reduce the total number of fields used. In an embodiment, the wireless device 202t can generate a MAC header without an FCS field. A message integrity check (MIC) field may be reused in place of the FCS field. In another embodiment, the wireless device 202t can generate a MAC header without a sequence number (SN) field. A packet number (PN) field may be reused in place of the SN field. When compressing MAC headers for encrypted frames, the wireless device 202t preferably is capable of decrypting the frame within the Short Interframe Space (SIFS).

In an embodiment, the wireless device 202t can calculate the MIC based on all the fields in the MAC header 300a, discussed above with respect to FIG. 3A, while only transmitting the fields in the MAC headers shown, for example, in one of FIGS. 18-23. More specifically, in embodiments where the duration field is omitted from the MAC header, the wireless device 202t can nevertheless include the duration field in the MIC calculation. In embodiments where the duration field is omitted from the MAC header, the wireless device 202t can nevertheless include the duration field in the MIC calculation. In embodiments where the receiver address field is omitted from the MAC header, the wireless device 202t can nevertheless include the receiver address field in the MIC calculation. In embodiments where the source address or transmit address field is omitted from the MAC header, the wireless device 202t can nevertheless include the source address or transmit address field in the MIC calculation. A person having ordinary skill in the art will appreciate that any omitted header field can be incorporated into the MIC.

Figure 25A:
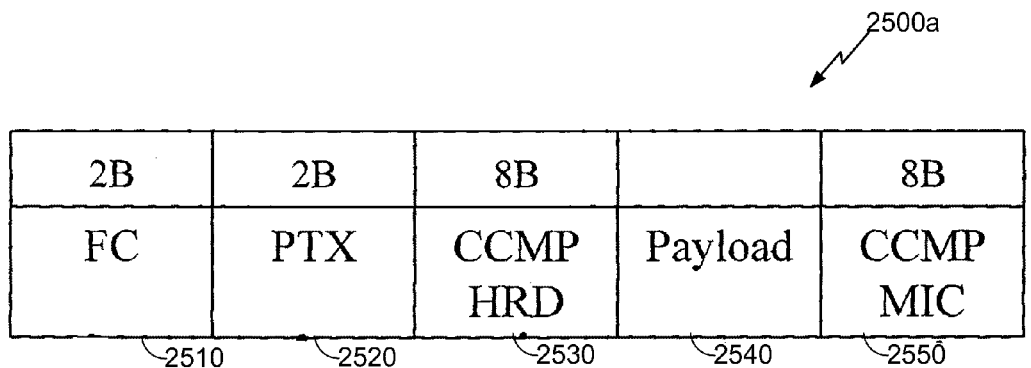
FIGS. 25A-C illustrate examples of types of compressed MAC headers with an encrypted payload.
Figure 25B:
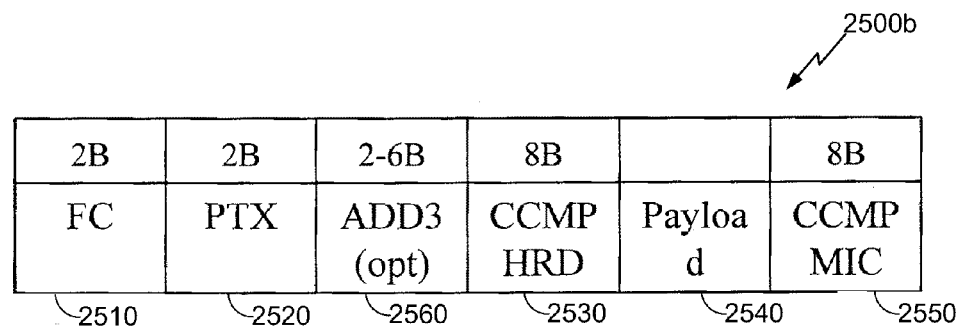
Figure 25C:
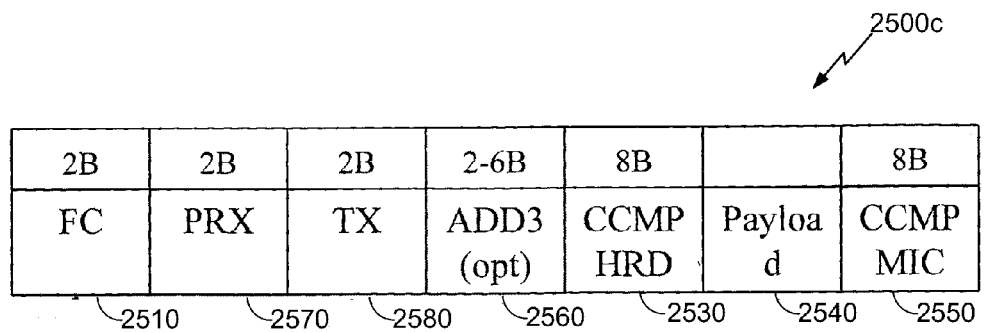

FIGS. 25A-C illustrate examples of types of compressed MAC headers with an encrypted payload. The illustrated embodiment of FIG. 25A shows a MAC header 2500a for a frame using cipher block chaining message authentication code protocol (CCMP) encryption. As shown in FIG. 25A, a MAC header 2500a can include a frame control (FC) field 2510, a partial transmit (PTA or PTX) field 2520, a CCMP header (HRD) field 2530, and CCMP message integrity check (MIC) field 2550. In the illustrated embodiment, the FC field 2510 is two bytes long, the PTX field 2520 is 2 bytes long, the CCMP HRD field 2530 is eight bytes long, and the CCMP MIC field 2550 is eight bytes long. Although a payload 2540 is depicted for reference, it may not be part of the MAC header 2500a. At least some of the fields described herein with respect to FIG. 25A can be similar to corresponding fields described above with respect to FIG.

3A. In various embodiments, the MAC header 2500a can include additional fields not shown and can omit one or more fields shown. A person having ordinary skill in the art will appreciate that the fields of the MAC header 2500a can be any size.

With continuing reference to FIG. 25A, the MAC header 2500a can omit a receiver address field, such as the a1 field 325a described above with respect to FIG. 3A. Accordingly, the wireless device 202t can include the receiver address in calculating the MIC 2550. When a receiver, such as the wireless device 202r, receives the MAC header 2500a, it may implicitly know its own address. For example, in an embodiment, the wireless device 202r may store its own network address in the memory 206. Accordingly, the receiver can calculate an expected MIC based on one or more fields in the MAC header 2500a combined with an implicitly known receiver address. The receiver can then compare the expected MIC to the received MIC field 2550 from the MAC header 2500a. If the received MIC field 2550 matches the expected MIC calculated using an implicit receiver address omitted from the MAC header 2500a, the receiver can determine that a frame associated with the MAC header 2500a was addressed to the receiver and that it was correctly received.

As illustrated in FIG. 25A, the MAC header 2500a can omit a source or transmit address field (not shown), such as the a2 field 320 described above with respect to FIG. 3A. For example, where a receiver can only receive data from an access point, the transmit address field can be omitted. In some embodiments, however, a partial transmit address (PTA or PTX) field 2520 is included in the MAC header 2500a. The PTX field 2520 may be included in network environments where a wireless device may be uploading data, or in a Tunneled Direct Link Setup (TDLS) environment. In an embodiment, the PTX field 2520 can be based on the transmitter's MAC address. For example, the PTX field 2520 can include a preset number of the least significant bits (LSBs) of the transmitter's MAC address. As discussed above, the PTX field 2520 can allow a wireless receiver to narrow down the number of keys it searches upon receipt of a frame containing the MAC header 2500a. In other embodiments, the MAC header 2500a can include the transmit address field.

As shown in FIG. 25B, a MAC header 2500b can include the frame control (FC) field 2510, the partial transmit address (PTA or PTX) field 2520, the frame sequence number (SEQ) field 2530, and the frame control sequence (MIC) field 2550. Although the payload 2540 is depicted for reference, it may not be part of the MAC header 2500b. In various embodiments, the MAC header 2500b can include additional fields not shown and can omit one or more fields shown. For example, as illustrated in FIG. 25B, the MAC header 2500b includes a destination address (ADD3) field 2560. In an embodiment, the ADD3 field 2560 can be the a3 field 325a discussed above with respect to FIG. 3A. The ADD3 field 2560 can be used in network environments where frames can be relayed to their ultimate destination.

As shown in FIG. 25C, a MAC header 2500c can include the frame control (FC) field 2510, a partial receiver address (PRA or PRX) field 2570, the transmit address (TX) field 2520, the frame sequence number (SEQ) field 2530, and the frame control sequence (MIC) field 2550. Although the payload 2540 is depicted for reference, it may not be part of the MAC header 2500c. In various embodiments, the MAC header 2500c can include additional fields not shown and can omit one or more fields shown. For example, as illustrated in FIG. 25C, the MAC header 2500c includes the destination address (ADD3) field 2560. The MAC header 2500c may include the PRX field 2570 in order to provide the receiver with some indication of whether it checks the MIC field 2550. For example, if the receiver's address does not match the PRX field 2570, it can decide not to calculate an expected MIC because the received MIC field 2550 may be unlikely to match. If the receiver's address does match the PRX field 2570, however, it can decide to calculate an expected MIC in order to determine whether the frame is addressed to the receiver. In other words, the PRX field 2570 can provide the receiver with a way to avoid further processing when a received frame is not addressed to the receiver. Less processing can result in lower power consumption.

In an embodiment, the PRX field 2570 can be based on the receiver's MAC address. In another embodiment, the PRX field 2570 can be based on both the receiver's MAC address and a transmit MAC address. For example, the PRX field 2570 can be a hash of the transmitter's MAC address and an ID of the receiver. In various embodiments, other preliminary indications can be used to allow a receiver to discard a received frame without calculating an expected frame check.

In some embodiments, other portions of particular data packets may also be reduced in size. For example, an ACK frame can be compressed similar to how MAC headers can be compressed as discussed above.

FIG. 26 illustrates an example of an ACK frame 2600, of a type used in legacy systems for communication. For example, the ACK frame 2600 includes 4 fields: a fc field 2605, a dur field 2610, an a1 field 2615, and a fcs field 2620. In some embodiments, the dur field 2610 can be removed as discussed above for the MAC header 300. In some embodiments, a PRA can be used instead of the a1 field 2615 as discussed above with respect to the MAC headers. For example, the wireless device 202r may assume the data packet is intended for it based on the fact that the previously received packet from the wireless device 202t was for the wireless device 202r (such as by indication in an a1 field 2615 included in the previous packet). In some embodiments, the PRA may be included in the PHY header. In some embodiments, the fc field 2605 may be reduced in size as discussed above with respect to the MAC headers. In some embodiments, the fcs field 2620 may be made shorter by reducing the size of the cyclic redundancy check. In some embodiments the ACK may contain no address fields and the source and destination are inferred from its timing SIFS after the end of a preceding data packet.

FIGS. 27 and 28 illustrate different embodiments of compressed ACK frames that include certain fields and do not include other fields as discussed above, and that can be used for communication between the wireless device 202t and the wireless device 202r. The fields may be used in the manners discussed above. It should be noted that other ACK frames, not illustrated herein, that may have different combinations of fields based on the above discussion are also within the scope of the disclosure.

FIG. 27 illustrates an ACK frame similar to FIG. 26. However, in the ACK frame of FIG. 27, the dur field, a1 field, and fcs field are not included. An optional hcs field is included in the ACK frame, which functions as a reduced fcs. Further the fc field is reduced in size. As shown, in the fc field; the subtype field, to-ds field, from-ds field, more frag field, pf field, and order field are removed. Further, an a3 present field is added to indicate whether an a3 field is present or not in the ACK frame of FIG. 27 (in the illustrated example it is not present). The fc field further includes a compressed a3 present (compr a3) field that indicates whether or not the a3 address of the ACK frame corresponds to an a3 address stored at the receiving device as discussed above.

FIG. 28 illustrates an ACK frame similar to FIG. 27. However, the ACK frame of FIG. 28 further includes a pra field.

Figure 29A:
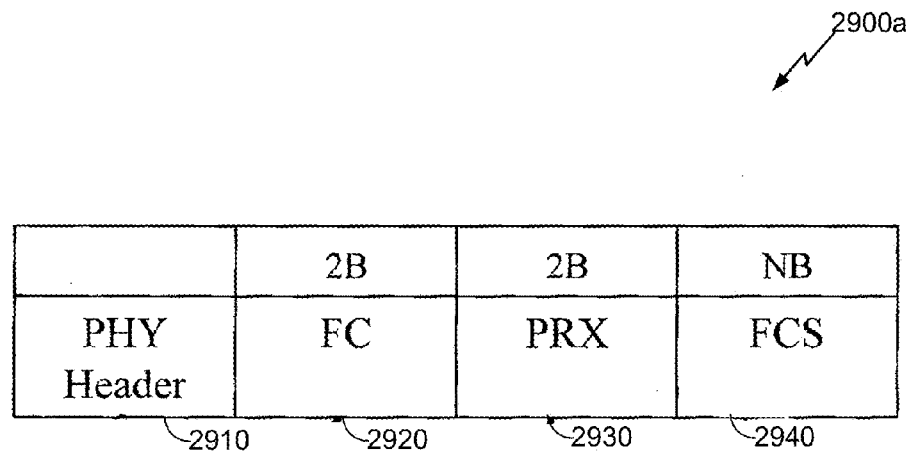
FIGS. 29A-C illustrate examples of compressed acknowledgement (ACK) frames.
Figure 29B:
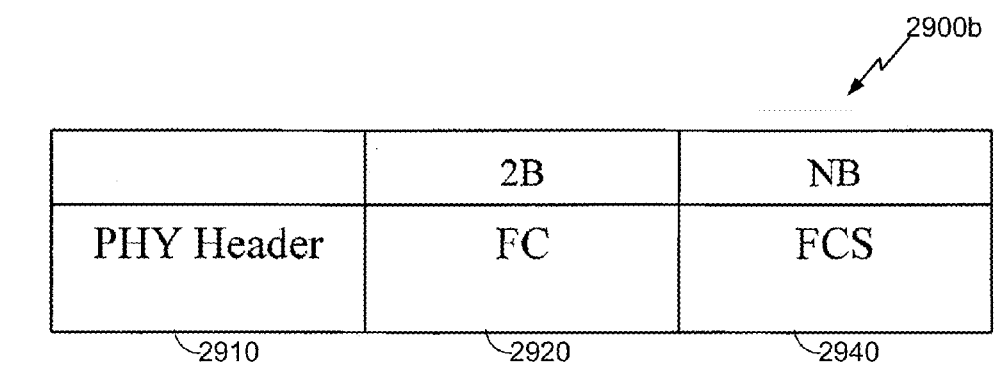
Figure 29C:
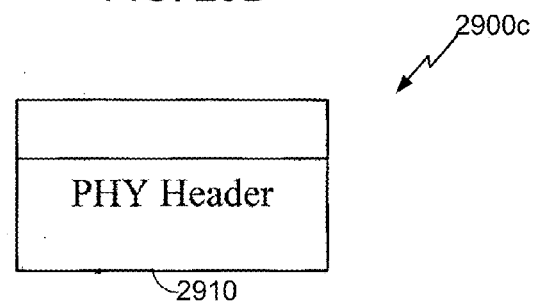

FIGS. 29A-C illustrate examples of compressed acknowledgement (ACK) frames. As shown in FIG. 29A, an ACK frame 2900a can include a physical layer (PHY) header 2910, a frame control (FC) field 2920, a partial receiver (PRA or PRX) field 2930, and a frame control sequence (FCS) field 2940. In the illustrated embodiment, the FC field 2920 is two bytes long, the PTX field 2920 is 2 bytes long, the SEQ field 2930 is two bytes long, the PRX field 2930 is two bytes long, and the FCS field 2940 is a variable length. At least some of the fields described herein with respect to FIG. 29A can be similar to corresponding fields described above with respect to FIG. 26. In various embodiments, the ACK frame 2900a can include additional fields not shown and can omit one or more fields shown. A person having ordinary skill in the art will appreciate that the fields of the ACK frame 2900a can be any size.

The ACK frame 2900a may include the PRX field 2930 in order to provide the receiver with some indication of whether it checks the FCS field 2940. For example, if the receiver's address does not match the PRX field 2930, it can decide not to calculate an expected FCS because the received FCS field 2940 may be unlikely to match. If the receiver's address does match the PRX field 2930, however, it can decide to calculate an expected FCS in order to determine whether the frame is addressed to the receiver. In other words, the PRX field 2930 can provide the receiver with a way to avoid further processing when a received frame is not addressed to the receiver. Less processing can result in lower power consumption.

In an embodiment, the PRX field 2930 can be based on the receiver's MAC address. In another embodiment, the PRX field 2930 can be based on both the receiver's MAC address and a transmit MAC address. For example, the PRX field 2930 can be a hash of the transmitter's MAC address and an ID of the receiver. In various embodiments, other preliminary indications can be used to allow a receiver to discard a received frame without calculating an expected frame check.

As shown in FIG. 29A, an ACK frame 2900a can include the physical layer (PHY) header 2910, the frame control (FC) field 2920, and the frame control sequence (FCS) field 2940. In various embodiments, the ACK frame 2900b can include additional fields not shown and can omit one or more fields shown. In the illustrated embodiment, the ACK frame 2900b can omit a receiver address field, such as the a1 field 2615 described above with respect to FIG. 26. Accordingly, the wireless device 202t can calculate the FCS field 2940 as if the receiver address field were present in the ACK frame 2900b, even though the ACK frame 2900b may not contain the receiver address field.

In an embodiment, when a receiver, such as the wireless device 202r, receives the ACK frame 2900b, it may implicitly know its own address. For example, in an embodiment, the wireless device 202r may store its own network address in the memory 206. Accordingly, the receiver can calculate an expected FCS based on one or more fields in the ACK frame 2900b combined with an implicitly known receiver address. The receiver can then compare the expected FCS to the received FCS field 2950 from the ACK frame 2900b. If the received FCS field 2950 matches the expected FCS calculated using an implicit receiver address omitted from the ACK frame 2900b, the receiver can determine that a frame associated with the ACK frame 2900b was addressed to the receiver and that it was correctly received.

As shown in FIG. 29C, an ACK frame 2900c can include only the physical layer (PHY) header 2910. A PHY preamble with no data may be referred to as an NDP. In various embodiments, the ACK frame 2900c can include additional fields not shown and can omit one or more fields shown. In the illustrated embodiment, an acknowledging device, such as the wireless device 202t, can send the ACK frame 2900 at a time known to a receiving device. The receiving device may infer the information omitted from the ACK frame 2900c based on a time at which the ACK frame 2900c is received. For example, the receiving device may expect to receive an ACK frame 2900c after a delay after sending a message to be acknowledged. In an embodiment, the receiving device may expect to receive the ACK frame 2900c within a window of time.

In various embodiments, a device such as the wireless device 202t can send an NDP (i.e. a PHY preamble with no data) as an ACK. In another embodiment, the wireless device 202t can send an STF as an ack. In one embodiment, when the wireless device 202t sends a frame for which an immediate ACK is requested, the wireless device 202t can consider the frame to be successfully transmitted if an NDP is received starting within the SIFS time after the completion of the frame transmission.

In the various embodiments described herein, where portions of an acknowledgement (ACK) frame are omitted, the wireless device 202t can calculate the FCS based on one or more of the omitted portions. For example, the wireless device 202t can calculate the FCS based on all the fields in the ACK frame 2600, discussed above with respect to FIG. 26, while only transmitting the fields in the ACK frames shown in one of FIGS. 27-28. More specifically, in embodiments where the duration field is omitted from the ACK frame, the wireless device 202t can nevertheless include the duration field in the FCS calculation. In embodiments where the duration field is omitted from the ACK frame, the wireless device 202t can nevertheless include the duration field in the FCS calculation. In embodiments where the receiver address field is omitted from the ACK frame, the wireless device 202t can nevertheless include the receiver address field in the FCS calculation. A person having ordinary skill in the art will appreciate that any omitted header field can be incorporated into the FCS. Moreover, omitted header fields can be incorporated into frame checks other than the FCS, including a message integrity check (MIC).

As discussed above, many different types of MAC headers and ACK frames can be used for communication between the wireless device 202t and the wireless device 202r. Further, as discussed above, the MAC headers 300 and 300a illustrated in FIGS. 3 and 3A and the ACK frame 2600 illustrated in FIG. 26 are used for legacy systems. As discussed above, the fc field 305 or 305a (and similarly the fc field 2605) includes, among other fields, a protocol version (pv) field 372, a frame type (type) field 374, and frame subtype (subtype) field 376. The pv field 372 is 2 bits in length. A value of 00 for the pv field 372 indicates the use of the MAC header 300 or 300a as illustrated in FIGS. 3 and 3A (or the ACK frame 2600 as illustrated in FIG. 26 for ACK frames). The use of other types of MAC headers can be indicated by using other values of the pv field 372 (i.e., 01, 10, and 11). In addition or alternatively, the use of different types of MAC headers can be indicated by using different values for the type field 374 and/or the subtype field 376. The wireless devices may be configured to associate values for the fields with certain types of MAC headers and determine the type of MAC header used based on the field value.

In some implementations, an acknowledgement message may include an association identifier (AID) in the a1 field to identify a device. It may be desirable in certain implementations to include the AID in the a1 field for each acknowledgement message. Accordingly, in certain implementations, only the AID is used to identify a device in the a1 field. This may allow the receiver of the acknowledgement message to uniformly process the a1 field of the received acknowledgement signals because the type of identifier appearing in the a1 field will be similar for each acknowledgement message.

In some implementations described above, an AID may be used instead of full MAC address in the a2 field to identify a device. It may be desirable in certain implementations to configure the system to verify the integrity of the acknowledgment message such as by computing additional authentication data (AAD) and/or counter with cipher block chaining message authentication code (CCM) nonce based on the AID included in the a2 field. For example, the receiver device may be configured to map an AID of 13 bits to the full MAC address of 6 bytes. The full MAC address may then be used to compute a message integrity code (MIC). In another example, an AID can also be used to compute the MIC directly. For example, where MAC address length is 6 bytes, zeros may be padded into the AID (e.g., appended, prefix) to make the AID have a length of 6 bytes. In some implementations, random bits/bytes may be added to the AID to pad the AID such that the AID is same length as a full MAC address.

As discussed above, the pv subfield of the fc field may be used to indicate whether a MAC header is a legacy MAC header or a compressed MAC header. For example, a value of 0 for the pv subfield may indicate the MAC header is a legacy MAC header, and a value of 1 for the pv subfield may indicate the MAC header is a compressed MAC header. The compressed MAC header may have the format of any of the compressed MAC headers described herein.

For any of the compressed MAC headers described herein, certain fields may further be added or modified to support certain additional features. In some aspects, an extended frame control (efc) field may be added to any of the compressed MAC headers described herein. The efc field may comprise 3 bits. The efc field may be the last 3 bits of an aid field of the compressed MAC header. The efc may be utilized to add information for new features. For example, in some aspects, an a3 present subfield may be added to the fc field or another field (e.g., efc field) of the MAC header to indicate whether an a3 address (3$^{rd}$ address identifying a device) is included in the compressed MAC header. Additionally or alternatively, in some aspects, quality of service (QoS) subfields that indicate the value of certain QoS parameters are added to the fc field or another field of the MAC header (e.g., efc field), such as an access control (ac) subfield, an end of service period (eosp) subfield, an a-msdu subfield, and/or a queue size subfield. Additionally or alternatively, in some aspects, an ACK policy subfield may be moved to the SIG field of the compressed MAC header. Additionally or alternatively, in some aspects, an a4 subfield may be added to the fc field or another field (e.g., efc field) of the MAC header to indicate whether the packet is to be relayed. The a4 subfield may be 1 bit. It should be noted that any combination of these fields may used in any of the compressed MAC headers described herein to support the features of the fields. In some aspects, the compressed MAC header indicated by a value of 1 for the pv subfield may support features and have a format as discussed with respect to FIG. 30 or FIG. 31.

FIG. 30 illustrates an example of a frame control field format and a compressed MAC header format for a compressed MAC header packet without security. As shown, the frame control field 3000 includes a pv subfield 3002 of 2 bits, a type subfield 3004 of 4 bits, a from-AP subfield 3006 of 1 bit, an access category (ac) subfield 3008 of 2 bits, a retry subfield 3010 of 1 bit, a power management (pm) subfield 3012 of 1 bit, a mode data (md) subfield 3014 of 1 bit, a protected frame (pf) subfield 3016 of 1 bit, an a-msdu subfield 3018 of 1 bit, an end of service period (eosp) subfield 3020 of 1 bit, and an a3 present subfield 3022 of 1 bit. Of these subfields, as discussed above, the ac subfield 3008, the a-msdu subfield 3018 the eosp subfield 3020, and the a3 present subfield 3022 may be included or not included in the fc field 3000 in any combination so as to only support the features of the included fields.

The fc field 3000 may be a field of any compressed MAC header described herein. For example, the fc field 3000 may be a field of a compressed MAC header 3050, which may include the fc field 3000 of 2 octets, an aid field 3052 of 13 bits (in one aspect, R-AID may be included when from-ap subfield 3006=1, and T-AID may be included when from-AP subfield 3006=0), an efc field 3054 of 3 bits, a TA/RA field 3056 of 6 bits (in one aspect, TA may be included when from-ap subfield 3006=1, and RA may be included when from-AP subfield 3006=0), an a3 field 3058 of 6 bits (in one aspect, a3 field may only be present when a3 present subfield 3022 has a value of 1), and a sequence number (sn) field 3060 of 2 bits. The efc field 3054 may not be included in the compressed MAC header 3050. If included, the efc field 3054 may include an a4 subfield.

FIG. 30A illustrates another example of a frame control field format and a compressed MAC header format for a compressed MAC header packet without security. As shown, the frame control field 3000a includes a pv subfield 3002a of 2 bits, a type subfield 3004a of 2 bits, a subtype subfield 3005a of 4 bit, a from-AP subfield 3006a of 1 bit, a power management (pm) subfield 3012a of 1 bit, a mode data (md) subfield 3014a of 1 bit, a protected frame (pf) subfield 3016a of 1 bit, an a-msdu subfield 3018a of 1 bit, an end of service period (eosp) subfield 3020a of 1 bit, an a3 present subfield 3022a of 1 bit, and a more ppdu/rdg subfield 3024a of 1 bit. In some aspects, of these subfields, as discussed above, the a-msdu subfield 3018a, the eosp subfield 3020a, the a3 present subfield 3022a, and the more ppdu/rdg subfield 3024a may be included or not included in the fc field 3000a in any combination so as to only support the features of the included fields. In some aspects, the more ppdu/rdg subfield may be one of the 3 reserved bits of an efc field. In some aspects, the more ppdu/rdg subfield may be one of the available bits when a compressed MAC header does not include a fragment number field.

The fc field 3000a may be a field of any compressed MAC header described herein. For example, the fc field 3000a may be a field of a compressed MAC header 3050a, which may include the fc field 3000a of 2 octets, an aid field 3052a of 13 bits (in one aspect, R-AID may be included when from-ap subfield 3006a=1, and T-AID may be included when from-AP subfield 3006a=0), an efc or reserved field 3054a of 3 bits, a TA/RA field 3056a of 6 bits (in one aspect, TA may be included when from-ap subfield 3006a=1, and RA may be included when from-AP subfield 3006a=0), an a3 field 3058a of 6 bits (in one aspect, a3 field may only be present when a3 present subfield 3022 has a value of 1), and a sequence number (sn) field 3060a of 2 bits. The efc field 3054a may not be included in the compressed MAC header 3050. If included, the efc field 3054a may include an a4 subfield.

FIG. 30B illustrates another example of a frame control field format and a compressed MAC header format for a compressed MAC header packet. As shown, the frame control field 3000b includes a pv subfield 3002b of 2 bits, a type subfield 3004b of 2 bits, a from-AP subfield 3006b of 1 bit, and a power management (pm) subfield 3012b of 1 bit.

The fc field 3000b may be a field of any compressed MAC header described herein. For example, the fc field 3000b may be a field of a compressed MAC header 3050b, which may include the fc field 3000b of 2 octets, an aid field 3052b of 13 bits (in one aspect, R-AID may be included when from-ap subfield 3006b=1, and T-AID may be included when from-AP subfield 3006b=0), a more data subfield 3072b of 1 bit, a protected frame subfield 3074b of 1 bit, an eosp subfield 3076b of 1 bit, a TA/RA field 3056b of 6 bits (in one aspect, TA may be included when from-ap subfield 3006b=1, and RA may be included when from-AP subfield 3006b=0), an a3 field 3058b of 6 bits (in one aspect, a3 field may only be present when a3 present subfield is also present in the fc field 3000b (such as for a different frame type)), and a sequence number (sn) field 3060b of 2 bits.

In some aspects, of these subfields, as discussed above, the more data subfield 3072b, the protected frame subfield 3074b, and the eosp subfield 3076b may be included or not included in the compressed MAC header 3050b in any combination so as to only support the features of the included fields.

FIG. 31 illustrates an example of a frame control field format and a compressed MAC header format for a compressed MAC header packet with security. As shown, the frame control field 3100 may have the same format as discussed above with respect to frame control field 3000. The fc field 3100 may be a field of any compressed MAC header described herein. For example, the fc field 3100 may be a field of a compressed MAC header 3150, which has the same fields as the compressed MAC header 3050 including additional fields. The additional fields may include a packet PN field 3162 of 2 bits, and a MIC field 3164 of 8 bits.

In some aspects, a transmitter receiver pair (e.g., an STA transmitting to an AP over an uplink) may have several "flows" between them. For example, the devices in a wireless network may transmit/receive information between each other. The information may take the form of a series of packets transmitted from a source device (the transmitting device) to a destination device (the received device). The series of packets may be known as a "flow."

As referred to herein, a "flow" can be a series or sequence of packets transmitted from a source device to a destination device that the source devices labels as a flow. A flow may be associated with transmission of particular data from the source device to a destination device, for example, a particular file such as a video file. The packets of a flow, therefore, may share some relationship (at a minimum they are each transmitted from and received at the same devices). In an embodiment, a flow can include a sequence of multiple MAC Protocol Data Units (MPDUs) with common MAC header fields such as, for example, source address, destination address, Basic Service Set Identifier (BSSID), Quality of Service (QoS)/HT control, etc. In various embodiments, the destination device uses certain information about the packets to properly decode the packets of a flow. In certain aspects, the information used to decode a packet is sent in a header portion of the packet. The packets, therefore, may include header information and/or the data to be transmitted from the source device to the destination device.

In a flow, some of the header information discussed with respect to MAC header used to process a packet of the flow may be the same for all packets of the flow. This header information that does not change between packets of a flow may be referred to as, for example, "constant header information" or "common header information."

In certain aspects, instead of transmitting the constant header information in each packet of a flow, the constant header information may only be transmitted by the wireless device 202t in a subset of the packets of a flow. For example, the constant header information may be transmitted in only a first packet of the flow or another message. This first packet with the constant header information may be referred to as a "head" frame. The subsequent packets of the flow may be sent without the constant header information. These subsequent packets may include header information that changes from packet to packet of a flow and the data to be transmitted. Subsequent packet with such data may be referred to as "data" frames. The receiver, wireless device 202r, of the flow may store the constant header information received in the head frame and use it to process the data frames. Accordingly, the wireless device 202r may use a method of associating the data frames of the flow with the head frame.

In certain aspects, the wireless device 202t assigns a flow identifier to each flow that it transmits to another device. The flow identifier may be a unique identifier of a flow between a wireless device 202t and a wireless device 202r. For example, if the wireless device 202t and the wireless device 202r have multiple flows between each other (in either direction), each flow may be assigned a different flow identifier (e.g., 1, 2, 3, etc.). Accordingly, a device can determine if the packet is for the device based on the a1 and a2 fields and the flow based on the flow identifier. Each of the wireless device 202t and the wireless device 202r may keep track of the flows between the devices and associated flow identifiers so as not to assign the same flow identifier to multiple flows. Further, in certain aspects, when a flow is completed, as in all the data of a flow is transmitted between the wireless device 202t and the wireless device 202r and the flow is terminated, the associated flow identifier of the terminated flow may be used for a new flow.

Termination of a flow between the wireless device 202t and the wireless device 202r may be signaled to the wireless device 202r by the wireless device 202t. For example, the wireless device 202t may indicate within the last data frame of the flow that includes data to send to the wireless device 202r that it is the last data frame and the flow is terminated after receipt of the last data frame. For example, the indication may be via the value of a bit in a frame control field of the data frame.

In another aspect, the wireless device 202t may indicate termination of a flow by transmitting a termination frame or "tail" frame to the wireless device 202r that indicates the flow should be terminated. Accordingly, the wireless device 202t may transmit the last data frame without any indication to the wireless device 202r that it is the last data frame. Further, the wireless device 202t may transmit the tail frame after the last data frame to indicate to the wireless device 202r that the flow is terminated.

In some aspects, the head frames, data frames, and tail frames may comprise MAC protocol data units (MPDUs). In certain aspects, multiple MPDUs may be aggregated into an aggregated-MPDU (A-MPDU). In certain aspects, the data frames of a flow may be transmitted as part of the same A-MPDU. Further, in certain aspects, the head frame, data frames, and tail frame of a flow may be transmitted as part of the same A-MPDU.

Further, in certain aspects as discussed above, headers may have different fields when security is enabled for the data packet. For example, the packet may have a counter-mode/cbc-mac protocol (CCMP) header when security is enabled. The CCMP header may be part of the MAC header. Normally, the CCMP header includes several packet numbers (PNs) (e.g., PN0, PN1, PN2, PN3, PN4, PN5). The values of PN2, PN3, PN4, and PN5 may not change often. Accordingly, a base PN may be created based on PN2, PN3, PN4, and PN5 (e.g., PN2|PN3|PN4|PN5). The base PN may be sent as part of a message and stored for a pair of communicating devices. The CCMP may therefore not include the PN2, PN3, PN4, and PN5, but only the PN0 and PN1 fields. The receiver of a packet may reconstruct the CCMP header by combining the base PN including the PN2, PN3, PN4, and PN5 stored at the receiver with the received PN0 and PN1 fields. The CCMP header may be reconstructed before decoding of the packet as the encoding of the packet including any CRC type fields such as a MIC field or FCS field may be based on the full CCMP header. Such aspects may be related to aspects described in U.S. Provisional Application No. 61/514,365, filed Aug. 2, 2011, which is hereby expressly incorporated by reference herein.

It is to be understood that the methods and techniques discussed above can also be employed for other types of frames without departing from the scope of the invention. For example, the short addressing methods discussed above can also be used for management/controls frames (e.g., RTS/CTS frames) as discussed with reference to FIG. 13.

As discussed above, in some aspects the wireless device 202r may indicate to the wireless device 202t information (e.g., values for fields of the MAC header) that is stored at the wireless device 202r. The wireless device 202t may then omit such fields from the MAC header in packets sent to the wireless device 202r. For example, a new subtype may be defined (indicated by a value of the subtype field of the frame control field of a MAC header of a data packet) for a data packet that indicates it contains information about, or is itself indicative of, the information stored at the wireless device 202r. A wireless device 202t receiving the data packet which such information may then omit such information in the MAC header of packets sent to the wireless device 202r. The new subtype frame may be used in conjunction with any of the various examples of the MAC header described herein. For example, such information may be omitted from any of the examples of MAC headers described herein. Further, the wireless device 202t may utilize the same data frame subtype (indicated by a value of the subtype field of the frame control field of a MAC header of a data packet) in data packets omitting the information stored at the wireless device 202r for data packets sent to the wireless device 202r. The wireless device 202r receiving the data packets with such subtype may use the subtype as an indicator that the data stored at the wireless device 202r is to be used for values of fields not included in the data packet.

In some aspects, short MAC service data units MSDU may be aggregated using aggregated MSDU (A-MSDU). For example, if the length of the MSDUs is below a certain threshold, then the MSDUs may be aggregated. The A-MSDU may utilize a short (e.g., compressed) A-MSDU subframe header. The short A-MSDU subframe header may have a length field of 2 octets in length, versus a regular header which is 12 or 14 octets in length. The order bit in the frame control field of the header may be used or replaced with an a-msdu field to indicate whether or not a short A-MSDU subframe header is utilized in the data packet. For example, the frame control field may have the following format as shown in Table 1:

TABLE 1

Frame Control field for compressed frames

| Field Name | Length in bits | Description |
| --- | --- | --- |
| pv | 2 | protocol version (0 or 1 since there is no duration field) |
| type | 2 | frame type (extension) |
| subtype | 4 | frame subtype (compressed or compressed without a3) |
| to-ds | 1 | to-ds |
| from-ds | 1 | from-ds |
| more frag | 1 | more fragments |
| retry | 1 | retry |
| pm | 1 | power management |
| md | 1 | more data |
| pf | 1 | protected frame |
| a-msdu | 1 | indicates presence of a-msdu (short A-MSDU subframe format) |
| total | 16 | |

Figure 32:
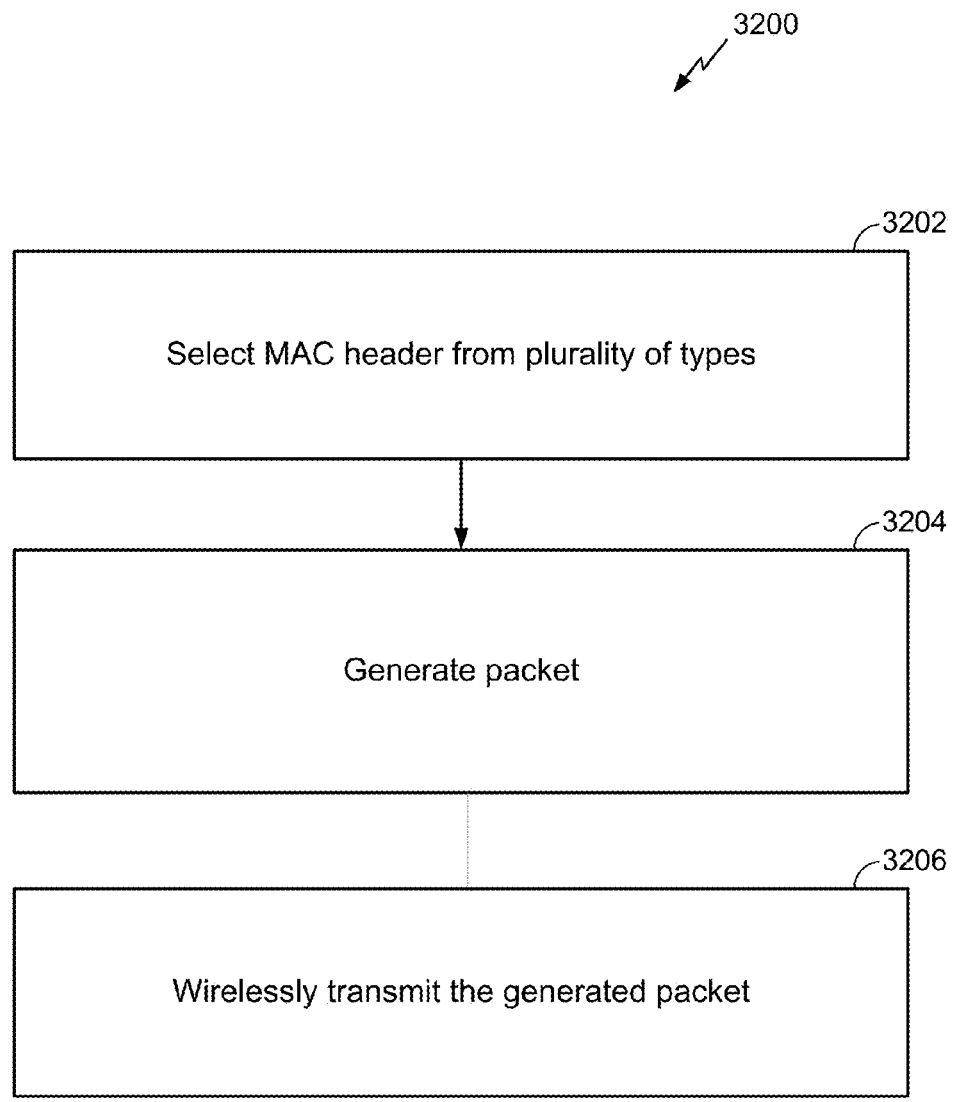
FIG. 32 illustrates an aspect of a method for transmitting a packet with a MAC header.

FIG. 32 illustrates an aspect of a method 3200 for transmitting a packet with a MAC header. The method 3200 may be used to selectively generate the packet with either the MAC header 300 or 300a as illustrated in FIGS. 3 and 3A, one of the MAC headers illustrated in FIG. 4, 4A, or 18-25, or another suitable MAC header based on the teachings herein. The packet may be generated at either the AP 104 or the STA 106 and transmitted to another node in the wireless network 100. Although the method 3200 is described below with respect to elements of the wireless device 202t, those having ordinary skill in the art will appreciate that other components may be used to implement one or more of the steps described herein.

At block 3202, the MAC header to include in the packet is selected from a plurality of types based on the type of information that needs to be communicated to the receiving device, as discussed above. The selection may be performed by the processor 204 and/or the DSP 220, for example.

Next, at block 3204, the packet is generated. The packet may comprise the MAC header and a payload. In some embodiments, the packet includes a first field indicating the type of MAC header used in the packet. The generation may be performed by the processor 204 and/or the DSP 220, for example.

Thereafter, at block 3206, the packet is wirelessly transmitted. The transmission may be performed by the transmitter 210, for example.

Figure 33:
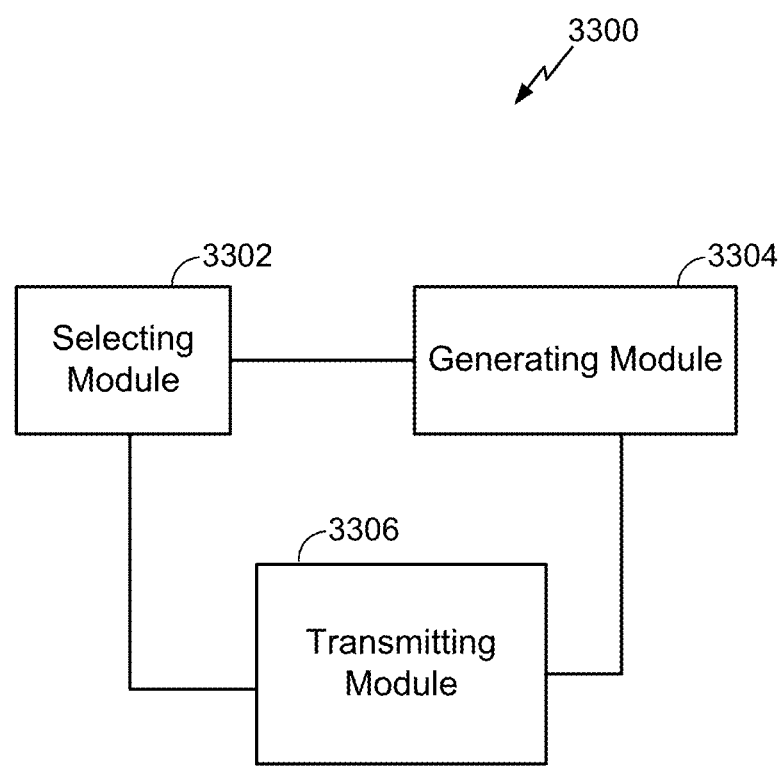
FIG. 33 is a functional block diagram of another exemplary wireless device that may be employed within the wireless communication system of FIG. 1.

FIG. 33 is a functional block diagram of another exemplary wireless device 3300 that may be employed within the wireless communication system 100. The device 3300 comprises a selecting module 3302 for selecting the MAC header to include in the packet from a plurality of types based on the type of information that needs to be communicated to the receiving device, as discussed above. The selecting module 3302 may be configured to perform one or more of the functions discussed above with respect to the block 3202 illustrated in FIG. 32. The selecting module 3302 may correspond to one or more of the processor 204 and the DSP 220. The device 3300 further comprises a generating module 3304 for generating the packet. The generating module 3304 may be configured to perform one or more of the functions discussed above with respect to the block 3204 illustrated in FIG. 32. The generating module 3204 may correspond to one or more of the processor 204 and the DSP 220. The device 3300 further comprises a transmitting module 3306 for wirelessly transmitting the generated packet. The transmitting module 3306 may be configured to perform one or more of the functions discussed above with respect to the block 3206 illustrated in FIG. 32. The transmitting module 3306 may correspond to the transmitter 210.

Figure 34:
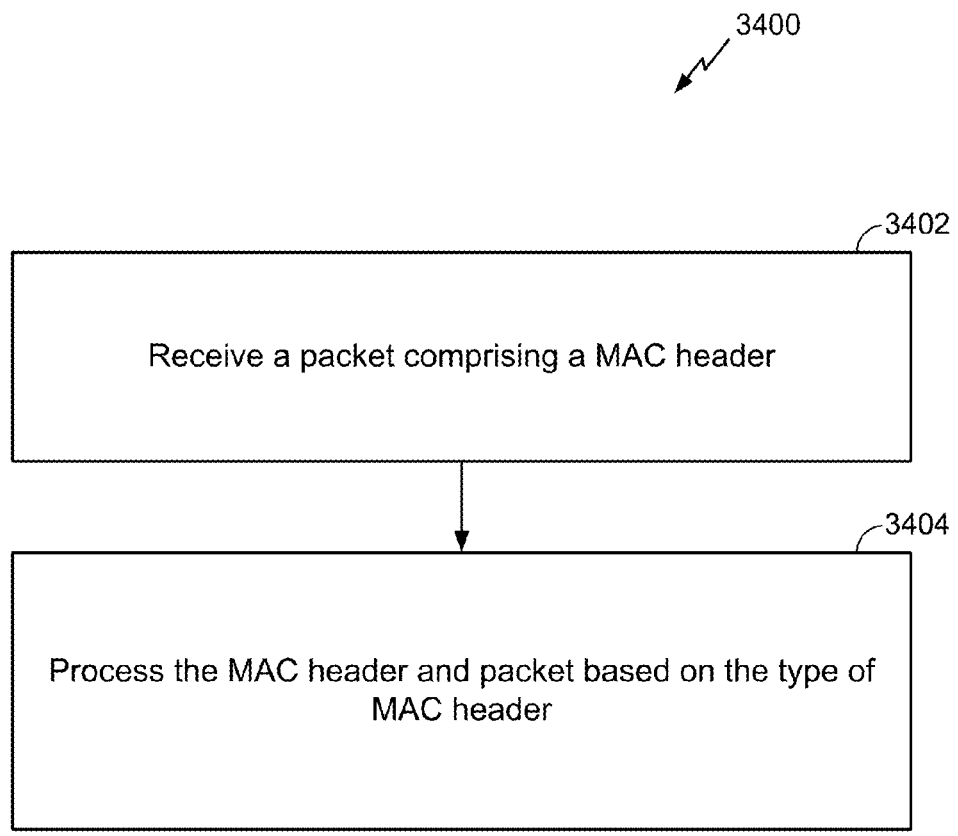
FIG. 34 illustrates an aspect of a method for receiving and processing a packet.

FIG. 34 illustrates an aspect of a method 3400 for receiving and processing a packet. The method 3400 may be used to receive and process the packet with either the MAC header 300 or 300a as illustrated in FIGS. 3 and 3A, one of the MAC headers illustrated in FIG. 4, 4A, or 18-25, or another suitable MAC header based on the teachings herein. The packet may be received at either the AP 104 or the STA 106 from another node in the wireless network 100. Although the method 3400 is described below with respect to elements of the wireless device 202r, those having ordinary skill in the art will appreciate that other components may be used to implement one or more of the steps described herein.

At block 3402, a wireless communication comprising the packet is received. The reception may be performed by the receiver 212, for example. In some aspects, the packet includes a first field indicating the type of MAC header used in the packet.

Subsequently, at block 3404, the MAC header and packet are processed according to the type of MAC header in the packet. The processing may be performed by the processor 204, the signal detector 218, and/or the DSP 220, for example.

Figure 35:
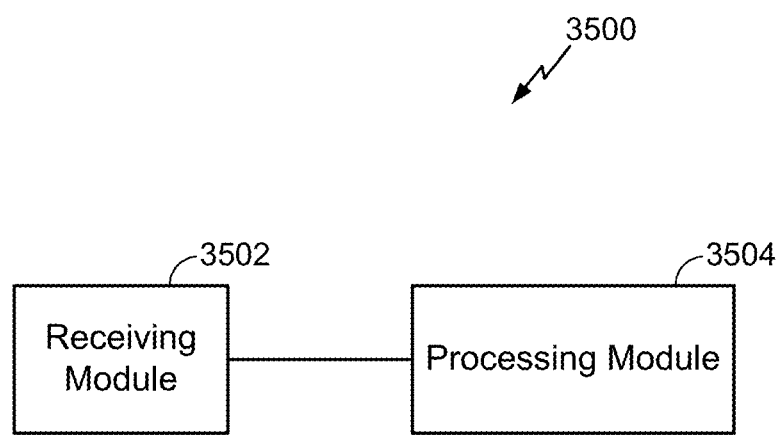
FIG. 35 is a functional block diagram of another exemplary wireless device that may be employed within the wireless communication system of FIG. 1.

FIG. 35 is a functional block diagram of another exemplary wireless device 3500 that may be employed within the wireless communication system 100. The device 3500 comprises a receiving module 3502 for wirelessly receiving a wireless communication comprising the packet. In some aspects, the packet includes a first field indicating the type of MAC header used in the packet. The receiving module 3502 may be configured to perform one or more of the functions discussed above with respect to the block 3402 illustrated in FIG. 34. The receiving module 3502 may correspond to the receiver 212. The device 3500 further comprises a processing module 3504 for processing the packet based on the type of MAC header in the packet. The processing module 3504 may be configured to perform one or more of the functions discussed above with respect to the block 3404 illustrated in FIG. 34. The processing module 3504 may correspond to one or more of the processor 204, the signal detector 218, and the DSP 220.

Figure 36:
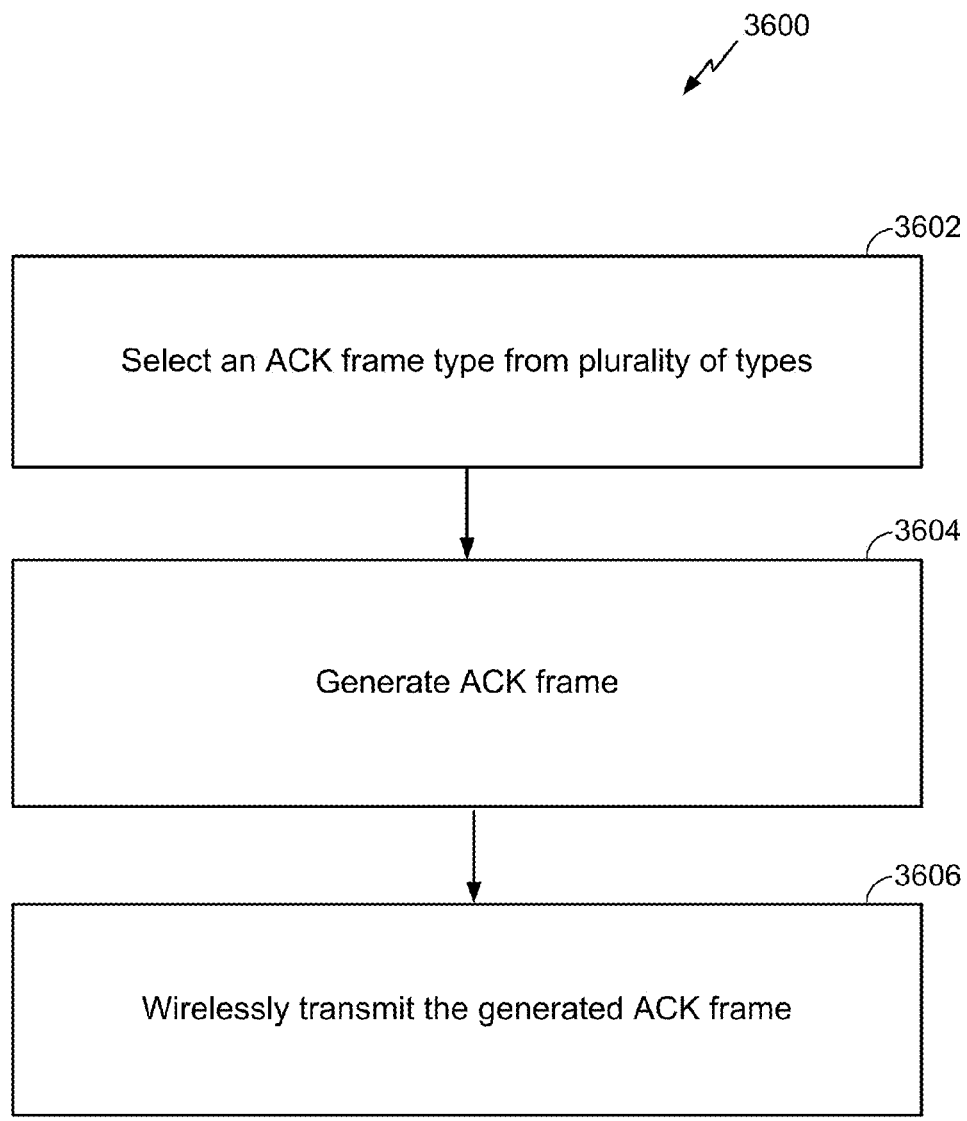
FIG. 36 illustrates an aspect of a method for transmitting an ACK frame.

FIG. 36 illustrates an aspect of a method 3600 for transmitting an ACK frame. The method 3600 may be used to selectively generate either the ACK frame 2600 illustrated in FIG. 26, one of the ACK frames illustrated in FIGS. 27-29, or another suitable ACK frame based on the teachings herein. The ACK frame may be generated at either the AP 104 or the STA 106 and transmitted to another node in the wireless network 100. Although the method 3600 is described below with respect to elements of the wireless device 202t, those having ordinary skill in the art will appreciate that other components may be used to implement one or more of the steps described herein.

At block 3602, an ACK frame type is selected from a plurality of types based on the type of information that needs to be communicated to the receiving device, as discussed above. The selection may be performed by the processor 204 and/or the DSP 220, for example.

Next, at block 3604, the selected ACK frame is generated. In some embodiments, the ACK frame includes a first field indicating the type of ACK frame. The generation may be performed by the processor 204 and/or the DSP 220, for example.

Further, at block 3606, the ACK frame is transmitted. The transmission may be performed by the transmitter 210, for example.

Figure 37:
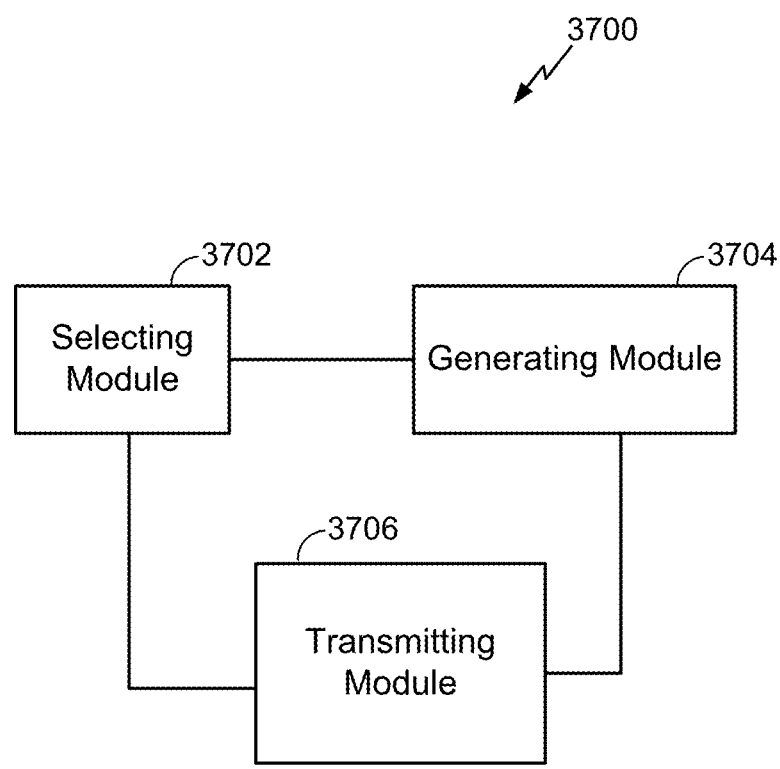
FIG. 37 is a functional block diagram of another exemplary wireless device that may be employed within the wireless communication system of FIG. 1.

FIG. 37 is a functional block diagram of another exemplary wireless device 3700 that may be employed within the wireless communication system 100. The device 3700 comprises a selecting module 3702 for selecting an ACK frame type from a plurality of types based on the type of information that needs to be communicated to the receiving device, as discussed above. The selecting module 3702 may be configured to perform one or more of the functions discussed above with respect to the block 3602 illustrated in FIG. 36. The selection module 3702 may correspond to one or more of the processor 204 and the DSP 220. The device 3700 further comprises a generating module 3704 for generating the selected ACK frame. The generating module 3704 may be configured to perform one or more of the functions discussed above with respect to the block 3604 illustrated in FIG. 36. The generating module 3704 may correspond to one or more of the processor 204 and the DSP 220. The device 3700 further comprises a transmitting module 3706 for transmitting the ACK frame. The transmitting module 3706 may be configured to perform one or more of the functions discussed above with respect to the block 3606 illustrated in FIG. 36. The transmitting module 3706 may correspond to the transmitter 210.

Figure 38:
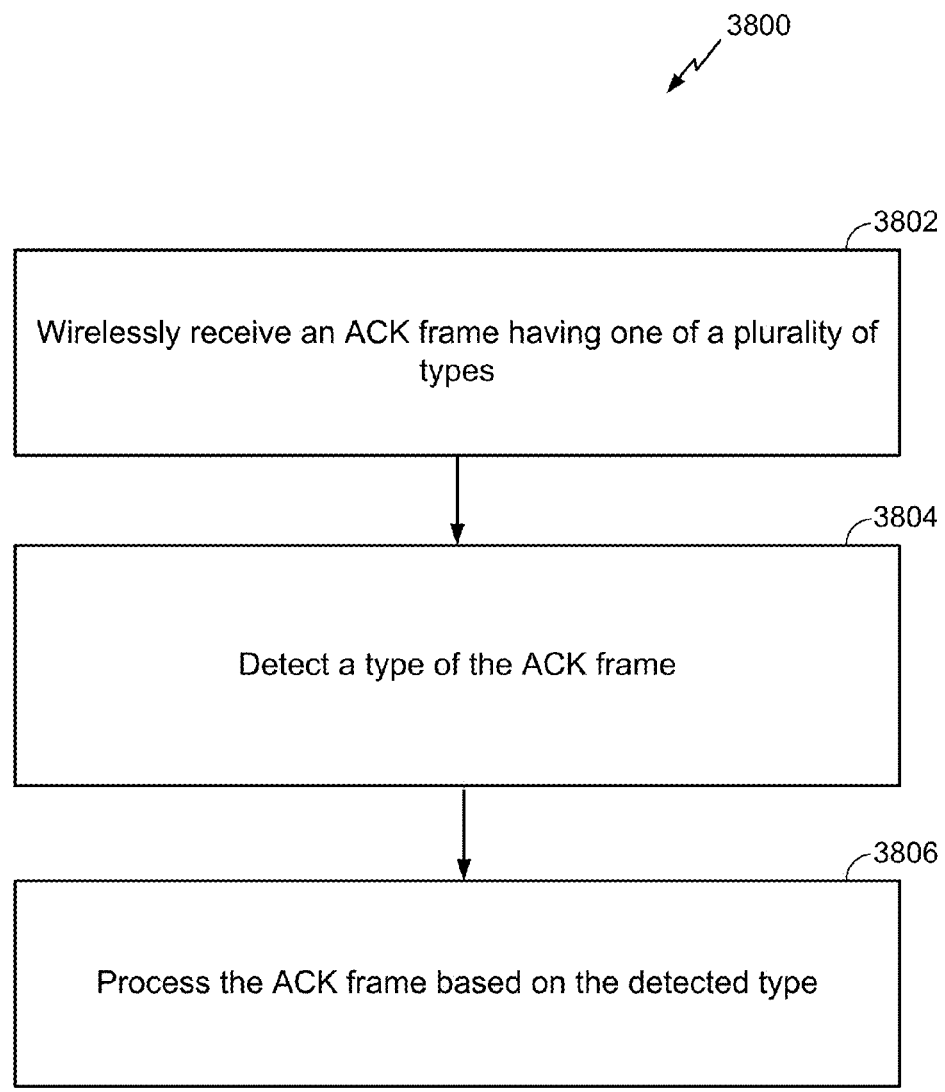
FIG. 38 illustrates an aspect of a method for receiving and processing an ACK frame.

FIG. 38 illustrates an aspect of a method 3800 for receiving and processing an ACK frame. The method 3800 may be used to receive and process the ACK frame 2600 illustrated in FIG. 26, one of the ACK frames illustrated in FIGS. 27-29, or another suitable ACK frame based on the teachings herein. The ACK frame may be received at either the AP 104 or the STA 106 from another node in the wireless network 100. Although the method 3800 is described below with respect to elements of the wireless device 202r, those having ordinary skill in the art will appreciate that other components may be used to implement one or more of the steps described herein.

At block 3802, an ACK frame having one of a plurality of types is wirelessly received. The reception may be performed by the receiver 212, for example. At block 3804, a type of the ACK frame is detected, such as by checking a field that indicates the type of the ACK frame. The detecting may be performed by the processor 204, the signal detector 218, and/or the DSP 220, for example.

Thereafter, at block 3806, the received ACK frame is processed based on he detected type. The processing may be performed by the processor 204, the signal detector 218, and/or the DSP 220, for example.

Figure 39:
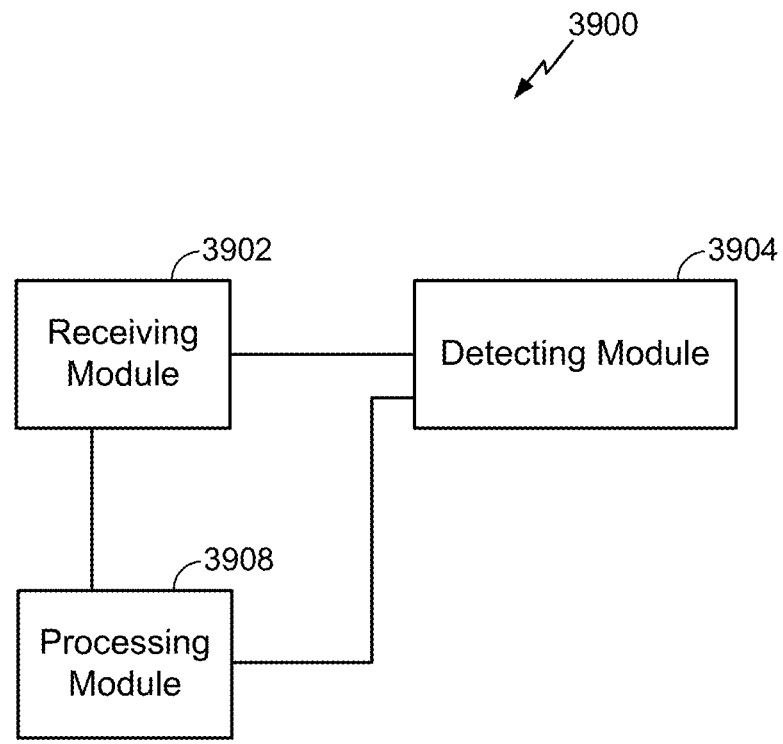
FIG. 39 is a functional block diagram of another exemplary wireless device that may be employed within the wireless communication system of FIG. 1.

FIG. 39 is a functional block diagram of another exemplary wireless device 3900 that may be employed within the wireless communication system 100. The device 3900 comprises a receiving module 3902 for wirelessly receiving a packet having one of at least two formats or types. The receiving module 3902 may be configured to perform one or more of the functions discussed above with respect to the block 3802 illustrated in FIG. 38. The receiving module 3902 may correspond to the receiver 212. The device 3900 further comprises a detecting module 3904 for detecting the type of the ACK frame. The detecting module 3904 may be configured to perform one or more of the functions discussed above with respect to the block 3804 illustrated in FIG. 38. The detecting module 3904 may correspond to the processor 204, the signal detector 218, and/or the DSP 220, for example, in the receiver 212. The device 3900 further comprises a processing module 3906 for processing the ACK frame based on the detecting module 3904. The processing module 3906 may be configured to perform one or more of the functions discussed above with respect to the block 3806 illustrated in FIG. 38. The processing module 3906 may correspond to one or more of the processor 204, the signal detector 218, and the DSP 220.

Figure 40:
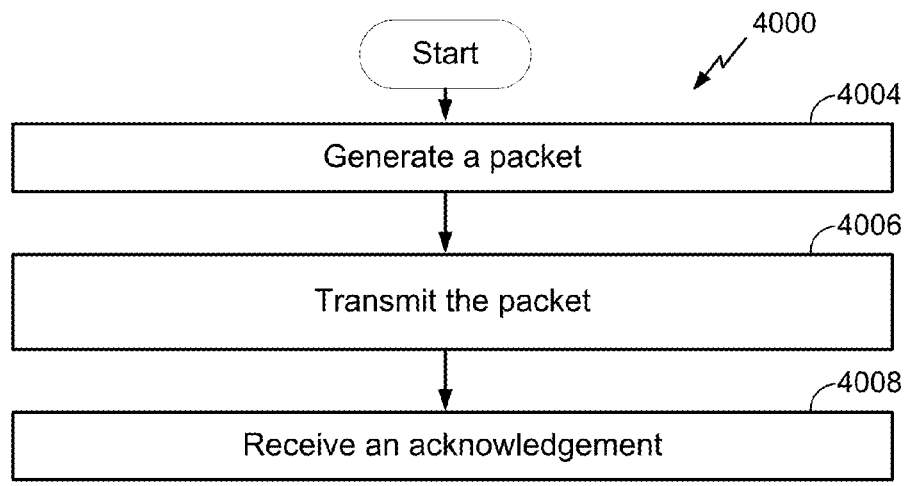
FIG. 40 illustrates an aspect of a method for transmitting a packet with a MAC header.

FIG. 40 illustrates an aspect of a method 4000 for transmitting a packet with a MAC header. The method 4000 may be used to selectively generate the packet with either the MAC header 300 or 300a as illustrated in FIGS. 3 and 3A, one of the MAC headers illustrated in FIG. 4, 4A, or 18-25, or another suitable MAC header based on the teachings herein. The packet may be generated at either the AP 104 or the STA 106 and transmitted to another node in the wireless network 100. Although the method 4000 is described below with respect to elements of the wireless device 202t, those having ordinary skill in the art will appreciate that other components may be used to implement one or more of the steps described herein.

At block 4004, the packet is generated. The packet may comprise the MAC header and a payload. In some embodiments, the packet includes a first field indicating the type of MAC header used in the packet. The generation may be performed by the processor 204 and/or the DSP 220, for example. The MAC header may include a local identifier of either a transmitter of the data packet or a receiver of the data packet, and a global identifier of the other of the transmitter of the data packet and the receiver of the data packet.

Thereafter, at block 4006, the packet is wirelessly transmitted. The transmission may be performed by the transmitter 210, for example.

At a block 4008, an ACK is received from the recipient of the packet in response to receiving the packet. The ACK may include at least a portion of the data included in the packet. The reception may be performed by the receiver 212, for example.

Figure 41:
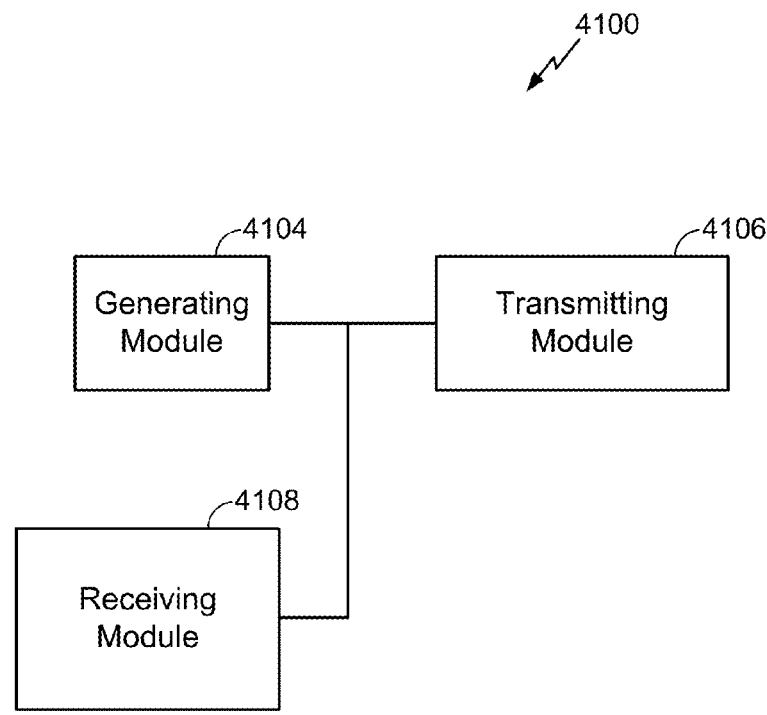
FIG. 41 is a functional block diagram of an exemplary wireless device that may be employed within the wireless communication system of FIG. 1.

FIG. 41 is a functional block diagram of an exemplary wireless device 4100 that may be employed within the wireless communication system 100. The device 4100 comprises a generating module 4104 for generating the packet. The generating module 4104 may be configured to perform one or more of the functions discussed above with respect to the block 4004 illustrated in FIG. 40. The generating module 4004 may correspond to one or more of the processor 204 and the DSP 220. The device 4100 further comprises a transmitting module 4106 for wirelessly transmitting the generated packet. The transmitting module 4106 may be configured to perform one or more of the functions discussed above with respect to the block 4006 illustrated in FIG. 40. The transmitting module 4106 may correspond to the transmitter 210. The device 4100 further comprises a receiving module 4108 for wirelessly receiving an ACK. The receiving module 4108 may be configured to perform one or more of the functions discussed above with respect to the block 4008 illustrated in FIG. 40. The receiving module 4108 may correspond to the receiver 212.

Figure 42:
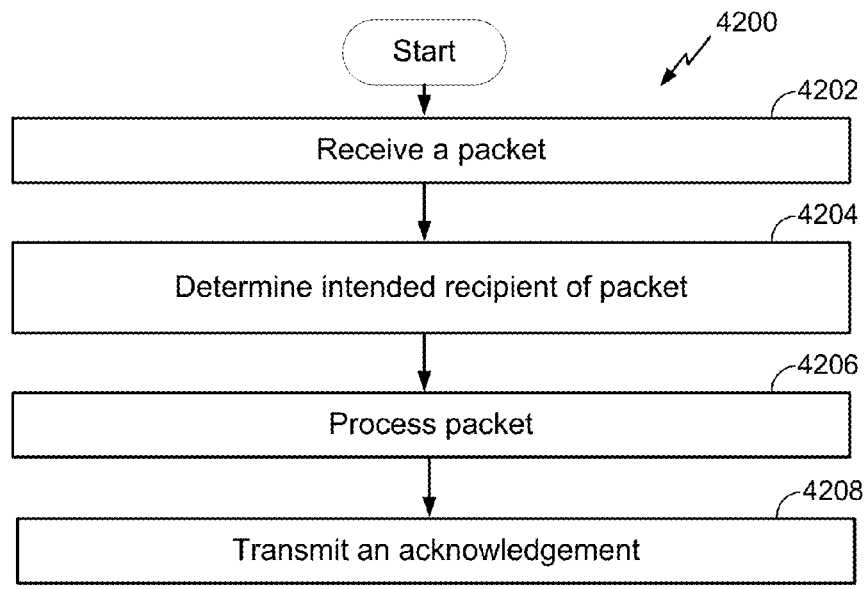
FIG. 42 illustrates an aspect of a method for receiving and processing a packet.

FIG. 42 illustrates an aspect of a method 4200 for receiving and processing a packet. The method 4200 may be used to receive and process the packet with either the MAC header 300 or 300a as illustrated in FIGS. 3 and 3A, one of the MAC headers illustrated in FIG. 4, 4A, or 18-25, or another suitable MAC header based on the teachings herein. The packet may be received at either the AP 104 or the STA 106 from another node in the wireless network 100. Although the method 4200 is described below with respect to elements of the wireless device 202r, those having ordinary skill in the art will appreciate that other components may be used to implement one or more of the steps described herein.

At block 4202, a wireless communication comprising the packet is received. The reception may be performed by the receiver 212, for example. In some aspects, the packet includes a first field indicating the type of MAC header used in the packet.

Subsequently, at block 4204, it is determined if the wireless device 202r is the intended recipient of the packet. The determination may be made based on the MAC header of the packet which may include a local identifier of either a transmitter of the data packet or a receiver of the data packet, and a global identifier of the other of the transmitter of the data packet and the receiver of the data packet. The determining may be performed by the processor 204, the signal detector 218, and/or the DSP 220, for example.

Further, at a block 4206, the wireless device 202r processes the packet if it is the intended recipient. The processing may be performed by the processor 204, the signal detector 218, and/or the DSP 220, for example. At a block 4208, the wireless device 202r may transmit an ACK in response to receiving the packet. The ACK may include at least a portion of the data included in the packet. The transmission may be performed by the transmitter 210, for example.

Figure 43:
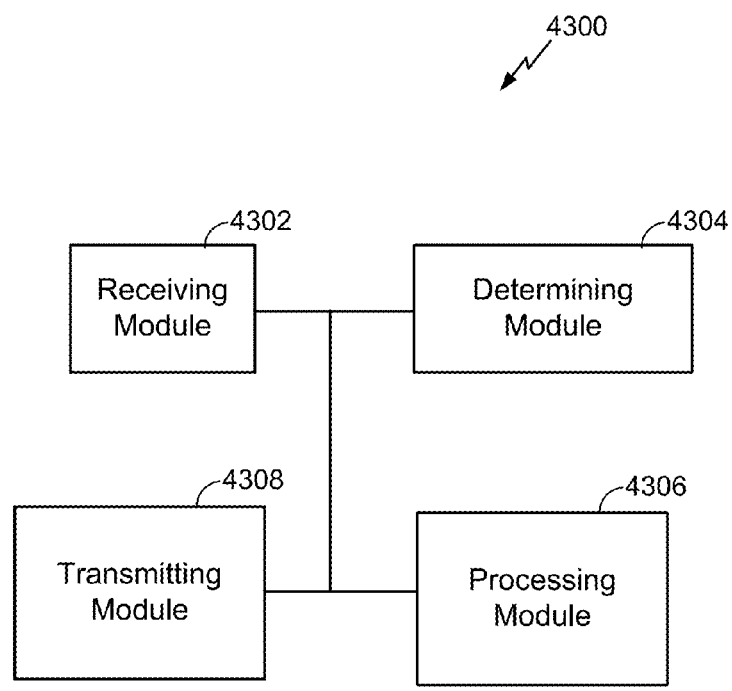
FIG. 43 is a functional block diagram of another exemplary wireless device that may be employed within the wireless communication system of FIG. 1.

FIG. 43 is a functional block diagram of another exemplary wireless device 4300 that may be employed within the wireless communication system 100. The device 4300 comprises a receiving module 4302 for wirelessly receiving a wireless communication comprising the packet. The receiving module 4302 may be configured to perform one or more of the functions discussed above with respect to the block 4202 illustrated in FIG. 42. The receiving module 4302 may correspond to the receiver 212. The device 4300 further comprises a determining module 4304 determining an intended recipient of the packet. The determining module 4304 may be configured to perform one or more of the functions discussed above with respect to the block 4204 illustrated in FIG. 42. The determining module 4304 may correspond to one or more of the processor 204, the signal detector 218, and the DSP 220. The device 4300 further comprises a processing module 4306 for processing the packet. The processing module 4306 may be configured to perform one or more of the functions discussed above with respect to the block 4206 illustrated in FIG. 42. The processing module 4306 may correspond to one or more of the processor 204, the signal detector 218, and the DSP 220. The device 4300 further comprises a transmitting module 4308 for transmitting an ACK. The transmitting module 4308 may be configured to perform one or more of the functions discussed above with respect to the block 4208 illustrated in FIG. 42. The transmitting module 4308 may correspond to one or more of the processor 204 and the transmitter 210.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of communicating in a wireless network, the method comprising:
generating a packet including a local identifier of either a transmitter of the packet or a receiver of the packet and a media access control address of the other of the transmitter and the receiver, the local identifier identifying either the transmitter or the receiver within a basic service set containing at least one of the transmitter or the receiver, the media access control address identifying either the transmitter or the receiver globally;
selecting one of the local identifier or the media access control address to identify the transmitter based on a link type for transmitting the packet, the link type being one of a downlink, an uplink, or a direct link, the selecting comprising:
selecting the local identifier to identify the receiver and the media access control address to identify the transmitter when the link type is the downlink;
selecting the local identifier to identify the transmitter and the media access control address to identify the receiver when the link type is the uplink; and
selecting the local identifier to identify the transmitter and the media access control address to identify the receiver when the link type is the direct link; and
transmitting the packet from the transmitter to the receiver.

2. The method of claim 1, wherein the local identifier comprises an association identifier.

3. The method of claim 2, wherein the association identifier comprises 13 bits and the media access control address comprises 48 bits.

4. The method of claim 1, wherein the packet further includes information indicating the link type.

5. The method of claim 4, wherein the information is included in at least one of a to-distribution system field and a from-distribution system field.

6. The method of claim 1, wherein an identifier of the receiver precedes an identifier of the transmitter in the packet.

7. The method of claim 1, wherein the local identifier and the media access control address in combination uniquely define a pair consisting of the receiver and the transmitter.

8. The method of claim 1, wherein the packet includes a field indicating if at least one of a destination address field and a source address field is present in the packet.

9. The method of claim 8, wherein the field that identifies whether the packet includes at least one of a destination address field and a source address field is one or more of a type field and a subtype field of a frame control field.

10. The method of claim 8, wherein the field that identifies whether the packet includes at least one of a destination address field and a source address field is a single bit.

11. The method of claim 1, wherein the packet includes a field that identifies whether the packet includes a compressed header or an uncompressed header.

12. The method of claim 11, wherein the field that identifies whether the packet includes a compressed header or an uncompressed header is a protocol version field.

13. The method claim 11, wherein the field that identifies whether the packet includes a compressed header or an uncompressed header is one or more of a type field and a subtype field of a frame control field.

14. The method of claim 1, wherein the packet does not include at least one of a duration field, high throughput control field, and a quality of service control field.

15. The method of claim 1, wherein the packet includes a sequence control field.

16. An apparatus for communicating in a wireless network, the apparatus comprising:
a processor configured to:
generate a packet including a local identifier of either a transmitter of the packet or a receiver of the packet and a media access control header of the other of the transmitter and the receiver, the local identifier identifying either the transmitter or the receiver within a basic service set containing at least one of the transmitter or the receiver, the media access control address identifying either the transmitter or the receiver globally, and
select one of the local identifier or the media access control address to identify the transmitter based on a link type for transmitting the packet, the link type being one of a downlink, an uplink, or a direct link, the selection comprising:
selecting the local identifier to identify the receiver and the media access control address to identify the transmitter when the link type is the downlink;
selecting the local identifier to identify the transmitter and the media access control address to identify the receiver when the link type is the uplink; and
selecting the local identifier to identify the transmitter and the media access control address to identify the receiver when the link type is the direct link; and
a transmitter configured to transmit the packet to the receiver.

17. The apparatus of claim 16, wherein the local identifier comprises an association identifier.

18. The apparatus of claim 17, wherein the association identifier comprises 13 bits and the media access control address comprises 48 bits.

19. The apparatus of claim 16, wherein the packet further includes information indicating the link type.

20. The apparatus of claim 19, wherein the information is included in at least one of a to-distribution system field and a from-distribution system field.

21. The apparatus of claim 16, wherein an identifier of the receiver precedes an identifier of the transmitter in the packet.

22. The apparatus of claim 16, wherein the local identifier and the media access control address in combination uniquely define a pair consisting of the receiver and the transmitter.

23. The apparatus of claim 16, wherein the packet includes a field indicating if at least one of a destination address field and a source address field is present in the packet.

24. The apparatus of claim 23, wherein the field that identifies whether the packet includes at least one of a destination address field and a source address field is one or more of a type field and a subtype field of a frame control field.

25. The apparatus of claim 23, wherein the field that identifies whether the packet includes at least one of a destination address field and a source address field is a single bit.

26. The apparatus of claim 16, wherein the packet includes a field that identifies whether the packet includes a compressed header or an uncompressed header.

27. The apparatus of claim 26, wherein the field that identifies whether the packet includes a compressed header or an uncompressed header is a protocol version field.

28. The apparatus of claim 26, wherein the field that identifies whether the packet includes a compressed header or an uncompressed header is one or more of a type field and a subtype field of a frame control field.

29. The apparatus of claim 16, wherein the packet does not include at least one of a duration field, high throughput control field, and a quality of service control field.

30. The apparatus of claim 16, wherein the packet includes a sequence control field.

31. An apparatus for communicating in a wireless network, the apparatus comprising:
 means for generating a packet including a local identifier of either a transmitter of the packet or a receiver of the packet and a media access control address of the other of the transmitter and the receiver, the local identifier identifying either the transmitter or the receiver within a basic service set containing at least one of the transmitter or the receiver, the media access control address identifying either the transmitter or the receiver globally;
 means for selecting one of the local identifier or the media access control address to identify the transmitter based on a link type for transmitting the packet, the link type being one of a downlink, an uplink, or a direct link, the means for selecting comprising:
  selecting the local identifier to identify the receiver and the media access control address to identify the transmitter when the link type is the downlink;
  selecting the local identifier to identify the transmitter and the media access control address to identify the receiver when the link type is the uplink; and
  selecting the local identifier to identify the transmitter and the media access control address to identify the receiver when the link type is the direct link; and
 means for transmitting the packet to the receiver.

32. A non-transitory computer-readable medium comprising instructions that when executed by a computer cause the computer to perform a method of communicating in a wireless network, the method comprising:
 generating a packet including a local identifier of either a transmitter of the packet or a receiver of the packet and a media access control address of the other of the transmitter and the receiver, the local identifier identifying either the transmitter or the receiver within a basic service set containing at least one of the transmitter or the receiver, the media access control address identifying either the transmitter or the receiver globally;
 selecting one of the local identifier or the media access control address to identify the transmitter based on a link type for transmitting the packet, the link type being one of a downlink, an uplink, or a direct link, the selecting comprising:
  selecting the local identifier to identify the receiver and the media access control address to identify the transmitter when the link type is the downlink;
  selecting the local identifier to identify the transmitter and the media access control address to identify the receiver when the link type is the uplink; and
  selecting the local identifier to identify the transmitter and the media access control address to identify the receiver when the link type is the direct link; and
 transmitting the packet to the receiver.

* * * * *